US011332391B2

(12) United States Patent
Srinivasan et al.

(10) Patent No.: US 11,332,391 B2
(45) Date of Patent: May 17, 2022

(54) ION EXCHANGE BASED VOLATILE COMPONENT REMOVAL DEVICE FOR ION CHROMATOGRAPHY

(71) Applicant: DIONEX CORPORATION, Sunnyvale, CA (US)

(72) Inventors: Kannan Srinivasan, Tracy, CA (US); Sheetal Bhardwaj, Fremont, CA (US)

(73) Assignee: DIONEX CORPORATION, Sunnyvale, CA (US)

( * ) Notice: Subject to any disclaimer, the term of this patent is extended or adjusted under 35 U.S.C. 154(b) by 410 days.

(21) Appl. No.: 16/396,527

(22) Filed: Apr. 26, 2019

(65) Prior Publication Data

US 2019/0322547 A1 Oct. 24, 2019

Related U.S. Application Data

(62) Division of application No. 14/540,786, filed on Nov. 13, 2014, now abandoned.

(51) Int. Cl.
*C02F 1/42* (2006.01)
*G01N 30/96* (2006.01)
(Continued)

(52) U.S. Cl.
CPC ............... *C02F 1/42* (2013.01); *B01D 15/24* (2013.01); *B01D 19/00* (2013.01);
(Continued)

(58) Field of Classification Search
CPC ............... C02F 1/42; C02F 2001/422; C02F 2001/425; C02F 2201/46115; B01D 15/24;
(Continued)

(56) References Cited

U.S. PATENT DOCUMENTS 4,455,233 A 6/1984 Pohl et al.
4,751,189 A 6/1988 Rocklin
(Continued)

FOREIGN PATENT DOCUMENTS

JP S59218952 A 12/1984
JP 2010-529480 A 8/2010
(Continued)

OTHER PUBLICATIONS

DIONEX Data Sheet, Carbonate Removal Device 200 (CRD 200) for RFIC-EG Systems, 2010, 4 pages.
(Continued)

*Primary Examiner* — Jennifer Bahls
*Assistant Examiner* — Quang X Nguyen
(74) *Attorney, Agent, or Firm* — David A. Schell

(57) ABSTRACT

A method, device, and system for removing a volatile component from a liquid solution for a chromatographic separation are described. The method includes the flowing of a liquid solution through a first chamber of the device. A volatile component in the liquid solution is transported across a first ion exchange barrier from the first chamber to a second chamber. The first ion exchange barrier has a first charge. The second chamber includes an ion exchange packing having a second charge that is an opposite polarity to the first charge. The volatile component reacts with the ion exchange packing to create a charged component in the second chamber. The charged component having a third charge that is a same polarity to the first charge. The ion exchange packing is regenerated by electrolytically generating a hydronium or a hydroxide.

17 Claims, 11 Drawing Sheets

(51) Int. Cl.
  *B01D 61/44* (2006.01)
  *B01D 19/00* (2006.01)
  *B01D 15/24* (2006.01)
  *B01D 15/36* (2006.01)

(52) U.S. Cl.
  CPC ......... *B01D 19/0084* (2013.01); *B01D 61/44* (2013.01); *G01N 30/96* (2013.01); *B01D 15/361* (2013.01); *C02F 2001/422* (2013.01); *C02F 2001/425* (2013.01); *C02F 2201/46115* (2013.01)

(58) Field of Classification Search
  CPC ...... B01D 15/361; B01D 61/44; B01D 19/00; B01D 19/0084; B01D 61/48; G01N 30/96
  See application file for complete search history.

(56) References Cited

U.S. PATENT DOCUMENTS

| | | | |
|---|---|---|---|
| 4,999,098 | A | 3/1991 | Pohl et al. |
| 5,248,426 | A | 9/1993 | Stillian et al. |
| 5,352,360 | A | 10/1994 | Stillian et al. |
| 5,569,365 | A | 10/1996 | Rabin et al. |
| 5,597,734 | A | 1/1997 | Small et al. |
| 5,633,171 | A | 5/1997 | Small et al. |
| 5,773,615 | A | 6/1998 | Small et al. |
| 6,027,643 | A | 2/2000 | Small et al. |
| 6,077,434 | A | 6/2000 | Srinivasan et al. |
| 6,225,129 | B1 | 5/2001 | Liu et al. |
| 6,325,976 | B1 | 12/2001 | Small et al. |
| 6,328,885 | B1 | 12/2001 | Srinivasan et al. |
| 6,495,371 | B2 | 12/2002 | Small et al. |
| 6,508,985 | B2 | 1/2003 | Small et al. |
| 6,562,628 | B1 | 5/2003 | Liu et al. |
| 6,610,546 | B1 | 8/2003 | Liu et al. |
| 6,682,701 | B1 | 1/2004 | Liu et al. |
| 6,752,927 | B2 | 6/2004 | Srinivasan et al. |
| 7,306,720 | B2 | 12/2007 | Dasgupta et al. |
| 7,329,346 | B2 | 2/2008 | Liu et al. |
| 7,473,354 | B2 | 1/2009 | Liu et al. |
| 7,517,696 | B2 | 4/2009 | Srinivasan et al. |
| 7,618,535 | B2 | 11/2009 | Srinivasan et al. |
| 7,618,856 | B2 | 11/2009 | Ting et al. |
| 7,704,749 | B2 | 4/2010 | Srinivasan et al. |
| 8,021,555 | B2 | 9/2011 | Liu et al. |
| 8,043,507 | B2 | 10/2011 | Liu et al. |
| 8,293,099 | B2 | 10/2012 | Dasgupta et al. |
| 8,414,684 | B2 | 4/2013 | Liu et al. |
| 2001/0026773 | A1 | 10/2001 | Small et al. |
| 2001/0026774 | A1 | 10/2001 | Small et al. |
| 2002/0162804 | A1 | 11/2002 | Srinivasan et al. |
| 2004/0195100 | A1 | 10/2004 | Srinivasan et al. |
| 2006/0057733 | A1 | 3/2006 | Liu et al. |
| 2007/0062873 | A1 | 3/2007 | Liu et al. |
| 2008/0069731 | A1 | 3/2008 | Liu et al. |
| 2008/0311672 | A1 | 12/2008 | Dasgupta et al. |
| 2009/0101582 | A1 | 4/2009 | Liu et al. |
| 2009/0166293 | A1 | 7/2009 | Srinivasan et al. |
| 2009/0188798 | A1 | 7/2009 | Riviello |
| 2012/0241378 | A1 | 9/2012 | Riviello |
| 2017/0212087 | A1* | 7/2017 | Riviello ................. G01N 30/96 |

FOREIGN PATENT DOCUMENTS

| | | |
|---|---|---|
| JP | 2013191408 A | 9/2013 |
| JP | 2014512945 A | 5/2014 |
| WO | 2012129010 A1 | 9/2012 |

OTHER PUBLICATIONS

DIONEX Product Manual for the CES 300 Suppressor (ACES 300) (CCES 300), Doc. No. 065386, Rev. 01, Apr. 2010, 22 pages.
DIONEX Product Manual, Carbonate Removal Device CRD 300, Doc. No. 065213-01, http://dionex.su/en-us/webdocs/66619-065213-01-Man-CRD-300.pdf, Mar. 2008, 17 pages.
Sunden et al., "Carbon Dioxide Permeable Tubing for Postsuppression in Ion Chromatography," Anal. Chem. 1984, 56, 1085-1089.
Thermo Scientific Column Product Manual, Continuously Regenerated Trap (CR-TC 500, Capillary), P/N: 079684-01, Nov. 2012, 25 pages.

* cited by examiner

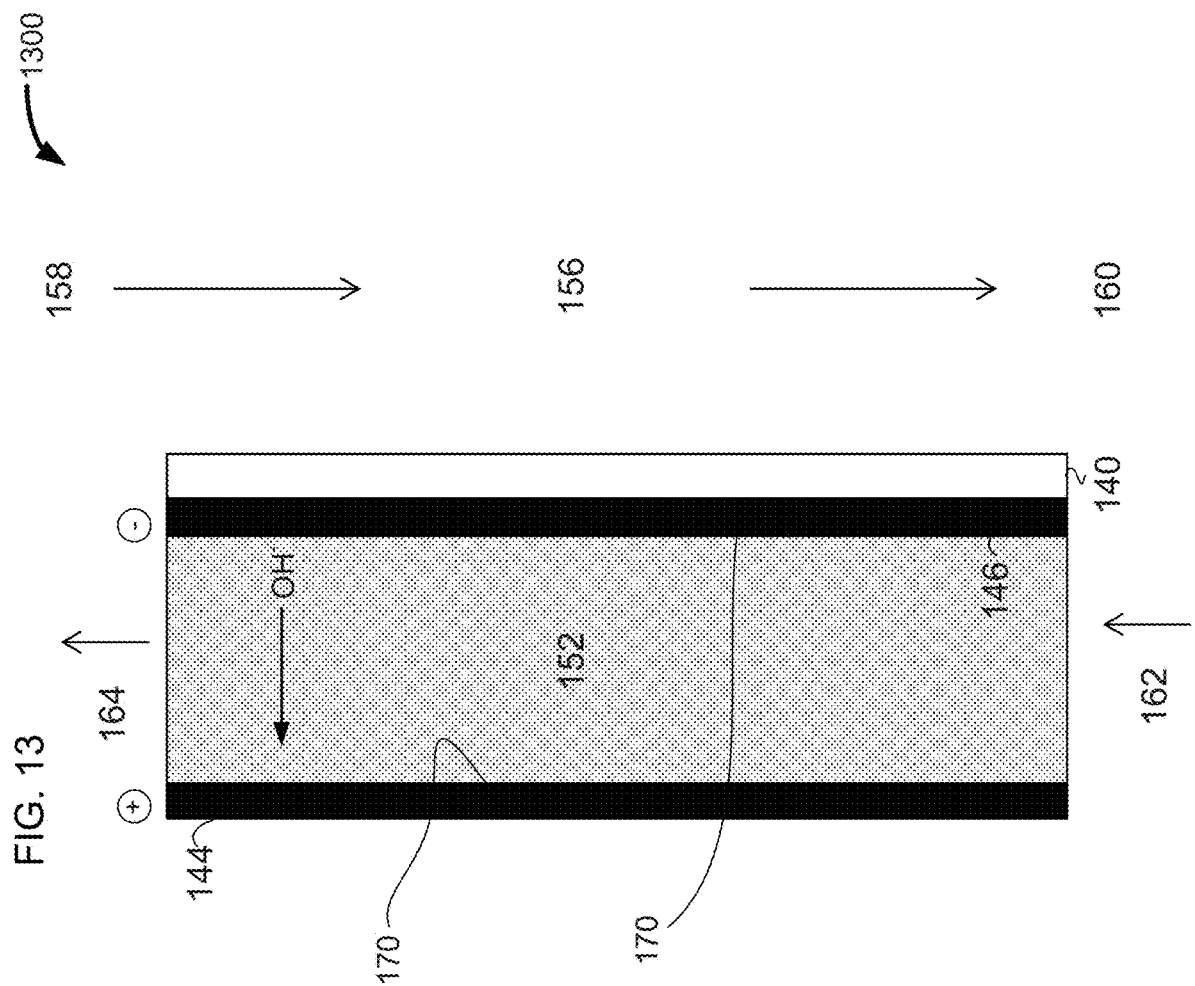

ION EXCHANGE BASED VOLATILE COMPONENT REMOVAL DEVICE FOR ION CHROMATOGRAPHY

CROSS-REFERENCE TO RELATED APPLICATION

This application is a divisional under 35 U.S.C. § 121 and claims the priority benefit of co-pending U.S. patent application Ser. No. 14/540,786, filed Nov. 13, 2014. The disclosure of the foregoing application is incorporated herein by reference.

BACKGROUND

Ion chromatography (IC) is a widely used analytical technique for the chemical analysis and separation of charged molecules. IC involves the separation of one or more analyte species from matrix components present in a sample. The analytes are typically ionic so that they can have an ionic interaction with a stationary phase. In IC, the stationary phase includes ionic moieties that ideally will bind to the charged analytes with varying levels of affinity. An eluent is percolated through the stationary phase and competes with the analyte and any matrix components for binding to the ionic moieties. The eluent is a term used to describe a liquid solution or buffer solution that is pumped into a chromatography column. During this competition, the analyte and any matrix component will separate from each other by eluting off of the stationary phase as a function of time and then be subsequently detected at a detector. Examples of some typical detectors are a conductivity detector, a UV-VIS spectrophotometer, and a mass spectrometer. Over the years, IC has developed into a powerful analytical tool that is useful for creating a healthier, cleaner, and safer environment where complex sample mixtures can be separated and analyzed for various industries such as water quality, environmental monitoring, food analysis, pharmaceutical, and biotechnology.

Carbon dioxide is a gas present in air and can potentially contaminate the sample or the eluent when performing IC. Carbon dioxide gas can dissolve in liquid to form carbonic acid, bicarbonate, and carbonate species. In particular, the presence of carbonate from dissolved carbon dioxide has been a source of interference for anion analysis with IC. The dissolution of carbon dioxide can raise the observed background conductivity even after a suppression of the eluent. This not only affects the peak response, but also makes peak integration difficult as the background is not stable and constant. The presence of carbon dioxide or carbonate in the sample can also be troublesome as the peak corresponding to carbonate can overlap with other analyte peaks in the chromatogram.

Gas permeable membranes can be used to remove dissolved carbon dioxide from the sample and/or the eluent. However, gas permeable membranes can be fragile and have relatively poor pressure tolerance. Currently, there is a trend to use increasing system pressure with smaller size chromatographic media to obtain faster and higher resolution sample separations. In addition to being fragile, gas permeable membranes can be expensive and difficult to manufacture with precise dimensions. It should be noted that the use of relatively thick walled membranes may increase the strength of the membrane, but will likely decrease the efficiency of gas removal and significantly increase expense. Gas permeable devices typically require reagents such as base streams from a reservoir or vacuum for driving the removal of the volatile component, which adds to the complexity of the device. As such, Applicant believes that there is a need for volatile component removing devices that are robust to high operating pressures, uses membranes made of relatively low cost materials, and efficiently removes the volatile gases like carbon dioxide without any external reagents or applying vacuum.

SUMMARY

A method of removing a volatile component from a liquid solution for a chromatographic separation is described. The method includes flowing the liquid solution, that includes the volatile component, through a first chamber. The volatile component can be transported across a first ion exchange barrier from the first chamber to a second chamber, where the first ion exchange barrier is at least partially disposed between the first chamber and the second chamber. The first ion exchange barrier can have a first charge, allowing the flow of ions having a charge opposite to the first charge, and does not allow bulk flow of the liquid solution. The second chamber can include an ion exchange packing having a second charge that is an opposite polarity to the first charge. The volatile component can react with the ion exchange packing to create a charged component in the second chamber. The charged component having a third charge that is a same polarity to the first charge. The ion exchange packing can be regenerated by electrolytically generating a hydronium or a hydroxide, in which the hydronium or the hydroxide is in electrical communication with the ion exchange packing.

In regards to the above method, the ion exchange packing can be in physical contact with the first ion exchange barrier.

In regards to any of the above methods, the electrolytically generated hydronium is formed at an anode and the electrolytically generated hydroxide is formed at a cathode.

In regards to any of the above methods, the volatile component can include a weakly ionized species selected from the group consisting of carbon dioxide, carbonic acid, and combinations thereof. The liquid solution can include an analyte, where the analyte includes an anion and the first charge of the first ion exchange barrier is negative.

In regards to any of the above methods, the ion exchange packing is in a hydroxide form where the carbonic acid reacts with the hydroxide form to create a negatively charged ion bound to the ion exchange packing.

In regards to any of the above methods, the electrolytically generated hydroxide is transported through the second chamber to regenerate the ion exchange packing and to remove the negatively charged ion out of the second chamber.

In regards to any of the above methods, the negatively charged ion includes an ionic species selected from the group consisting of carbonate, bicarbonate, and combinations thereof.

In regards to any of the above methods, the method further includes before the flowing of the liquid solution through the first chamber, suppressing the liquid solution with a suppressor that exchanges positively charged ions where the liquid solution contains an analyte. The analyte having a same charge as the first ion exchange barrier.

In regards to the above method, the suppressing of the liquid solution includes adding hydronium to the liquid solution.

In regards to any of the above methods, the method further includes flowing the liquid solution from the first chamber to a detector. A signal can be measured that is proportional to an analyte concentration. The liquid solution can flow from the detector to the second chamber. The liquid solution can flow through the ion exchange packing and out of the second chamber to a cathode chamber, and then to an anode chamber.

In regards to the above method, the cathode chamber includes the cathode, and a second ion exchange barrier is at least partially disposed between the cathode chamber and the second chamber. The second ion exchange barrier can have a positive charge, which allows the flow of negatively charged ions from the cathode chamber to the second chamber, and does not allow bulk flow of the liquid solution. The method further includes transporting the hydroxide through the second ion exchange barrier to the second chamber.

In regards to the above method, the anode chamber includes the anode, and a third ion exchange barrier is at least partially disposed between the anode chamber and the second chamber. The third ion exchange barrier can have a positive charge, which allows the flow of negatively charged ions from the second chamber to the anode chamber, and does not allow bulk flow of the liquid solution. The method further includes transporting the hydroxide from the second chamber to the anode chamber.

In regards to any of the above methods, the volatile component may include ammonia where the first charge of the first ion exchange barrier is positive.

In regards to any of the above methods, the first ion exchange barrier includes an ion exchange capillary tube or an approximately planar membrane.

In regards to any of the above methods, the liquid solution further includes an analyte and an eluent. The method further includes converting the analyte to a salt form in the first chamber.

In regards to any of the above methods, the eluent includes a sodium hydroxide.

A first embodiment of a device to remove volatile components from a liquid solution for a chromatographic separation is described. The first embodiment of the device can include a first chamber, a second chamber, and a first ion exchange barrier. The first chamber includes an inlet configured to receive the liquid solution that includes the volatile component, and an outlet configured to output the liquid solution with a substantial portion of the volatile component removed. The second chamber includes an ion exchange packing. The second chamber is in electrical communication with a first cathode and a first anode. The first cathode is configured to electrolytically generate a hydroxide, and the first anode is configured to electrolytically generate a hydronium. The first ion exchange barrier is at least partially disposed between the first chamber and the second chamber. The first ion exchange barrier can have a first charge, allows the flow of the volatile component and ions having a charge opposite to the first charge, and does not allow bulk flow of the liquid solution. The ion exchange packing can have a second charge that is an opposite polarity to the first charge. The ion exchange packing is configured to react with the volatile component to create a charged component having a same polarity as the first charge of the first ion exchange barrier, and the ion exchange packing is also configured to bind the charged component.

In regards to any of the embodiments of the device, the ion exchange packing is in physical contact with the first ion exchange barrier.

In regards to any of the embodiments of the device, the volatile component is selected from the group consisting of carbon dioxide, carbonic acid, and combinations thereof.

The liquid solution includes an analyte, where the analyte includes an anion and the first charge of the first ion exchange barrier is negative.

In regards to any of the embodiments of the device, the ion exchange packing is in the hydroxide form.

In regards to any of the embodiments of the device, the negatively charged ion includes an ionic species selected from the group consisting of carbonate, bicarbonate, and combinations thereof.

In regards to any of the embodiments of the device, the ion exchange packing includes a material selected from the group consisting of an ion exchange packing, an ion exchange screen, an ion exchange monolith, and a combination thereof.

In regards to any of the embodiments of the device, the second and third ion exchange barriers each include a membrane In regards to any of the embodiments of the device, the first ion exchange barrier includes an approximately planar membrane.

A second embodiment of a device to remove volatile components from a liquid solution for a chromatographic separation is described. The second embodiment can include features of any of the above embodiments of the device where the second embodiment further includes a cathode chamber and an anode chamber. The cathode chamber includes the first cathode, in which a second ion exchange barrier is at least partially disposed between the cathode chamber and the second chamber. The second ion exchange barrier can have a third charge that is an opposite polarity to the first charge. The second ion exchange barrier is configured to not allow bulk flow of the liquid solution, and to allow the flow of ions having a charge opposite to the third charge, from the cathode chamber to the second chamber. The anode chamber includes the first anode, in which a third ion exchange barrier is at least partially disposed between the anode chamber and the second chamber. The third ion exchange barrier can have a fourth charge that is an opposite polarity to the first charge. The third ion exchange barrier is configured to not allow bulk flow of the liquid solution, and to allow the flow of ions having a charge opposite to the fourth charge, from the second chamber to the anode chamber.

In regards to the second embodiment of the device, the outlet of the first chamber can be fluidically connected to an inlet of a detector. An outlet of the detector can be fluidically connected to an inlet of the second chamber. An outlet of the second chamber can be fluidically connected to an inlet of the cathode chamber. An outlet of the cathode chamber is fluidically connected to an inlet of the anode chamber. An outlet of the anode chamber can be fluidically connected to a waste chamber.

In regards to the second embodiment of the device, the cathode chamber and the anode chamber can be disposed on opposing ends of the second chamber.

In regards to any of the above devices, the volatile component may include ammonia where the first charge of the first ion exchange barrier is positive.

In regards to any of the above devices, the first ion exchange barrier includes an ion exchange capillary tube.

A third embodiment of a device to remove volatile components from a liquid solution for a chromatographic separation is described. The third embodiment can include features of the above devices where the first ion exchange barrier includes a first approximately planar membrane. The first anode and the first cathode are at least partially disposed in the second chamber. The first anode and the first cathode can each have a planar surface, where a plane of the first planar membrane is approximately perpendicular to planar surfaces of the first cathode and the first anode.

A fourth embodiment of a device to remove volatile components from a liquid solution for a chromatographic separation is described. The fourth embodiment can include the features of the third embodiment where the fourth embodiment further includes a third chamber and a fourth ion exchange barrier. The third chamber includes the ion exchange packing. A second cathode and a second anode are at least partially disposed in the third chamber. The second cathode is configured to electrolytically generate a hydroxide, and the second anode is configured to electrolytically generate a hydronium. The fourth ion exchange barrier is at least partially disposed between the first chamber and the third chamber. The fourth ion exchange barrier can have a same charge as the first ion exchange barrier, allows the flow of the volatile component and ions having a charge opposite to the first charge, and does not allow bulk flow of the liquid solution. The ion exchange packing can have the second charge, in which the fourth ion exchange barrier includes a second approximately planar membrane. The second anode and the second cathode can each have a planar surface, where a plane of the second approximately planar membrane is approximately perpendicular to planar surfaces of the second cathode and the second anode.

A fifth embodiment of a device to remove volatile components from a liquid solution for a chromatographic separation is described. The fifth embodiment can include features of the above first or second embodiment of a device where the first ion exchange barrier includes a first approximately planar membrane. The first anode and the first cathode are at least partially disposed in the second chamber. The first anode and the first cathode can each have a planar surface, where a plane of the first planar membrane is approximately parallel to planar surfaces of the first cathode and the first anode.

A sixth embodiment of a device to remove volatile components from a liquid solution for a chromatographic separation is described. The sixth embodiment can include the features of the fifth embodiment where the sixth embodiment includes a third chamber including the ion exchange packing. A second cathode and a second anode are at least partially disposed in the third chamber. The second cathode is configured to electrolytically generate a hydroxide, and the second anode is configured to electrolytically generate a hydronium. A fourth ion exchange barrier is at least partially disposed between the first chamber and the third chamber. The fourth ion exchange barrier can have a same charge as the first ion exchange barrier, allows the flow of the volatile component and ions having a charge opposite to the first charge, and does not allow bulk flow of the liquid solution. The ion exchange packing can have the second charge, in which the fourth ion exchange barrier includes a second approximately planar membrane. The second anode and the second cathode can each have a planar surface, where a plane of the second approximately planar membrane is approximately parallel to planar surfaces of the second cathode and the second anode.

A system to analyze a sample containing a volatile component is described. The system includes a volatile component removing device as described above and at least one chromatography component selected from the group consisting of a suppressor configured to remove eluent counterions where the eluent counterions have a charge opposite to an analyte ion where the suppressor is disposed upstream of the volatile component removing device, a pump disposed upstream of the volatile component removing device, a chromatography column fluidically connected to the volatile component removing device, a detector disposed downstream of the volatile component removing device, and combinations thereof.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

FIG. 13 illustrates another schematic embodiment of a volatile component removal device which is similar to the device of FIG. 11 except that it has only one side channel.

DETAILED DESCRIPTION OF EMBODIMENTS

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used herein, the terms "about" or "approximately" for any numerical values or ranges indicate a suitable dimensional tolerance that allows the part or collection of components to function for its intended purpose as described herein.

Carbonate contamination can stem from the sample or from the eluent. The presence of carbonate from the sample can result in a fairly broad chromatographic peak that could potentially co-elute with analytes of interest making quantitation difficult. The presence of carbonate in the eluent, particularly under gradient conditions, can be an issue where carbonate appears as a chromatographic peak that interferes with other peaks of interest. When using manually prepared eluents such as hydroxide, the exposure to air causes carbon dioxide to manifest itself as carbonate in the eluent. The presence of carbonate causes an elevated carbonic acid background when performing anion analysis with suppressed conductivity detection. With isocratic elution, the higher background from this type of contamination can impact the peak response since the background after suppression for anion analysis would be carbonic acid. The carbonic acid background would depress the peak signal from acids thus resulting in lower response for all analytes.

With gradient elution in addition to the higher background there is also a possibility that the peak corresponding to the residual carbonate in the eluent can interfere with the quantitation of specific ions such as sulfate. During anion analysis, the residual carbonate in the eluent can get focused during the gradient on the analytical column and elutes as a carbonate peak. Since carbonate after suppression is a weak acid, it elutes as a broad peak and can interfere with species such as sulfate which elutes in the near vicinity of carbonate in many columns. Another aspect of the carbonate eluent contamination is the higher background that, during a gradient, increases with increasing ionic strength. The net effect is changing baselines that make integration difficult.

Figure 8:
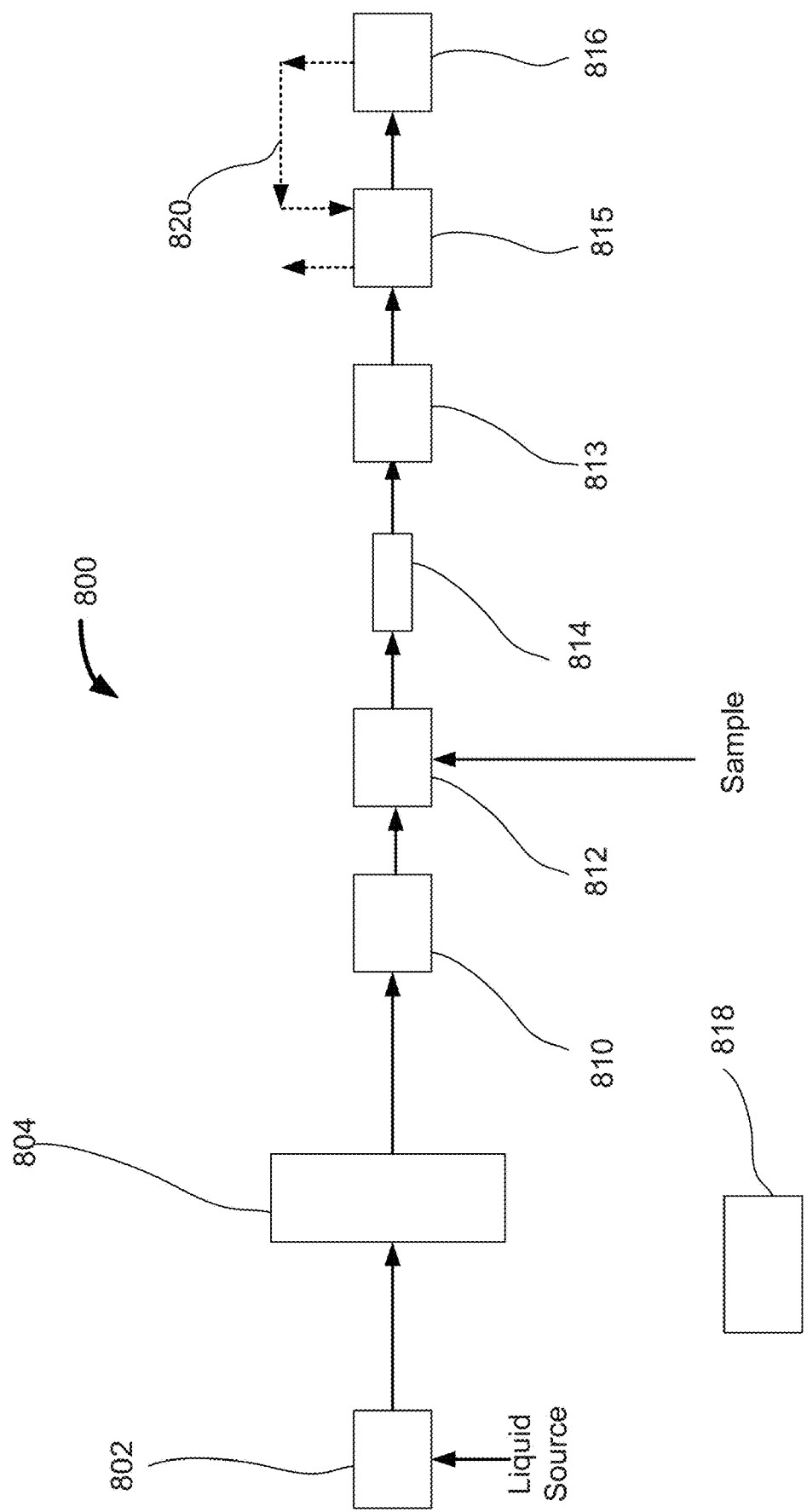
FIG. 8 illustrates an exemplary chromatography system suitable for use with the volatile component removal devices described herein.

The following will describe a general chromatography system suitable for use with volatile component removal devices described herein. FIG. 8 illustrates an embodiment of chromatography system 800 that includes a pump 802, an electrolytic eluent generating device 804, a degas assembly 810, an injection valve 812, a chromatographic separation device 814, a suppressor 813, volatile component removal device 815, a detector 816, and a microprocessor 818. A recycle line 820 may be used to transfer the liquid from an output of detector 816 to a regenerant portion of volatile component removal device 815.

Pump 802 can be configured to pump a liquid from a liquid source and be fluidically connected to electrolytic eluent generating device 804. In an embodiment, the liquid source may be deionized water, or an aqueous solution with electrolyte(s). Under certain circumstances where the liquid source for the pump 802 has an aqueous solution with electrolytes, the chromatography system 800 may be operated without the use of eluent generating device 804 and degas assembly 810. Pump 802 can be configured to transport the liquid at a pressure ranging from about 20 pounds per square inch (PSI) to about 6000 PSI. Under certain circumstances, pressures greater than 6000 PSI may also be implemented. It should be noted that the pressures denoted herein are listed relative to an ambient pressure (13.7 PSI to 15.2 PSI). Pump 802 may be in the form of a high pressure liquid chromatography (HPLC) pump. In addition, pump 802 can also be configured so that the liquid only touches an inert portion of pump 802 so that a significant amount of impurities does not leach out. In this context, significant means an amount of impurities that would interfere with the intended measurement. For example, the inert portion can be made of polyetherether ketone (PEEK) or at least coated with a PEEK lining, which does not leach out a significant amount of ions when exposed to a liquid.

Electrolytic eluent generating device 804 is configured to generate an eluent such as for example KOH or methanesulfonic acid. An eluent is a liquid that contains an acid, base, salt, or mixture thereof and can be used to elute an analyte through a chromatography column. Details regarding electrolytic eluent generating devices can be found in U.S. Pat. Nos. 6,225,129 and 6,682,701, which are hereby incorporated by reference herein.

Degas assembly 810 can be used to remove any electrolytic gases in the eluent stream. In an embodiment, a residual gas may be carbon dioxide, hydrogen, and oxygen. The gas can be swept out of degas assembly 810 using a wash fluid that flows through a low pressure channel of degas assembly 810, as described in U.S. Pat. No. 8,414,684, which is hereby incorporated by reference herein. Degas assembly 810 may include a tubing section that is gas permeable and liquid impermeable such as, for example, amorphous fluoropolymers or stretched polytetrafluoroethylene (commercially available under the trade names Teflon AF and Gore-Tex). The flowing liquid can be outputted from degas assembly 810 to injection valve 812 with a substantial portion of the gas removed. While FIG. 8 shows that the eluent generator and the degasser modules are at the high pressure side of the pump, it is possible to install the eluent generator and the degasser modules at the low pressure side of the pump (not shown). In this embodiment, the generated eluent is pumped through the pump and then to the chromatographic separation device.

Under certain circumstances where the electrolytic gases in the eluent stream have oxygen and hydrogen gas, an optional catalytic gas elimination column may be used to convert oxygen and hydrogen to water. Details regarding catalytic gas elimination devices can be found in U.S. Pat. Nos. 7,329,346 and 8,043,507, which are hereby incorporated by reference herein.

Injection valve 812 can be used to inject a bolus of a liquid sample into an eluent stream. The liquid sample may include a plurality of chemical constituents (i.e., matrix components) and one or more analytes of interest. Sample injection valve 812 will typically have at least two positions. In the first position, eluent will simply flow through injection valve 812 to chromatographic separation device 814 and a liquid sample can be loaded into a sample loop having a predetermined volume in injection valve 812. Once injection valve 812 is switched to the second position, eluent will flow through the sample loop and then introduce the liquid sample to chromatographic separation device 814. In an embodiment, injection valve 812 can be in the form of a six port valve.

Chromatographic separation device 814 can be used to separate various matrix components present in the liquid sample from the analytes of interest. This separation provides information on the chemical components present in the sample and concentration levels. Typically, chromatographic separation device 814 may be in the form of a hollow cylinder that contains a stationary phase. As the liquid sample flows through chromatographic separation device 814, the matrix components and target analytes can have a range of retention times as they are eluting off of chromatographic separation device 814. Depending on the characteristics of the target analytes and matrix components, they can have different affinities to the stationary phase in chromatographic separation device 814. An output of chromatographic separation device 814 can be fluidically connected to detector 816 to measure the presence and amount of the separated chemical constituents of the liquid sample. As illustrated in FIG. 8, suppressor 813 and volatile component removal device 815 are in between chromatographic separation device 814 and detector 816.

Suppressor 813 can be used to suppress the conductivity of the eluent and increase the conductivity of the fully dissociated analyte. In an embodiment, the eluent may be sodium hydroxide that is neutralized to water and the analyte may be chloride anion that is converted to a more conductive hydrochloric acid. Embodiments of suppressors are described in U.S. Pat. Nos. 4,999,098; 5,248,426; and 5,352,360, which are hereby incorporated by reference herein. An output of chromatographic separation device 814 can be fluidically connected to suppressor 813.

Volatile component removal device 815 is configured to remove volatile components from the effluent stream such as carbon dioxide or ammonia. In particular, volatile component removal device 815 can be especially well suited for removing carbon dioxide and carbonic acid, which is important for reducing background conductivity of the effluent stream, before the effluent flows to the detector 816. Carbon dioxide is referred to as a volatile component because it is a gas. Carbonic acid is also referred to as a volatile component because it is in equilibrium with carbon dioxide gas and water, as illustrated by Equation 1. In addition, carbonic acid can dissociate into hydrogen ion, bicarbonate ion ($HCO_3^-$), and carbonate ion ($CO_3^{2-}$).

$$CO_2 + H_2O \leftrightarrow H_2CO_3 \leftrightarrow H^+ + HCO_3^- + CO_3^{2-} \qquad \text{(Eq. 1)}$$

Detector 816 may be in the form of an electrochemical detector, a conductometric detector, an optical detector, a charge detector, or a combination thereof. Details regarding the charge detector that is based on a charged barrier and two electrodes can be found in U.S. Pat. No. 8,293,099, which is hereby fully incorporated by reference herein.

An electronic circuit may include microprocessor 818 and a memory portion. Microprocessor 818 can be used to control the operation of chromatography system 800. Microprocessor 818 may either be integrated into chromatography system 800 or be part of a personal computer that communicates with chromatography system 800. Microprocessor 818 may be configured to communicate with and control one or more components of chromatography system such as pump 802, electrolytic eluent generating device 804, injection valve 812, suppressor 813, volatile component removal device 815, and detector 816. Note that chromatography system 800 is a particular machine used to analyze standard solutions and sample solutions to identify chemical constituents and the associated concentration values.

Figure 1:
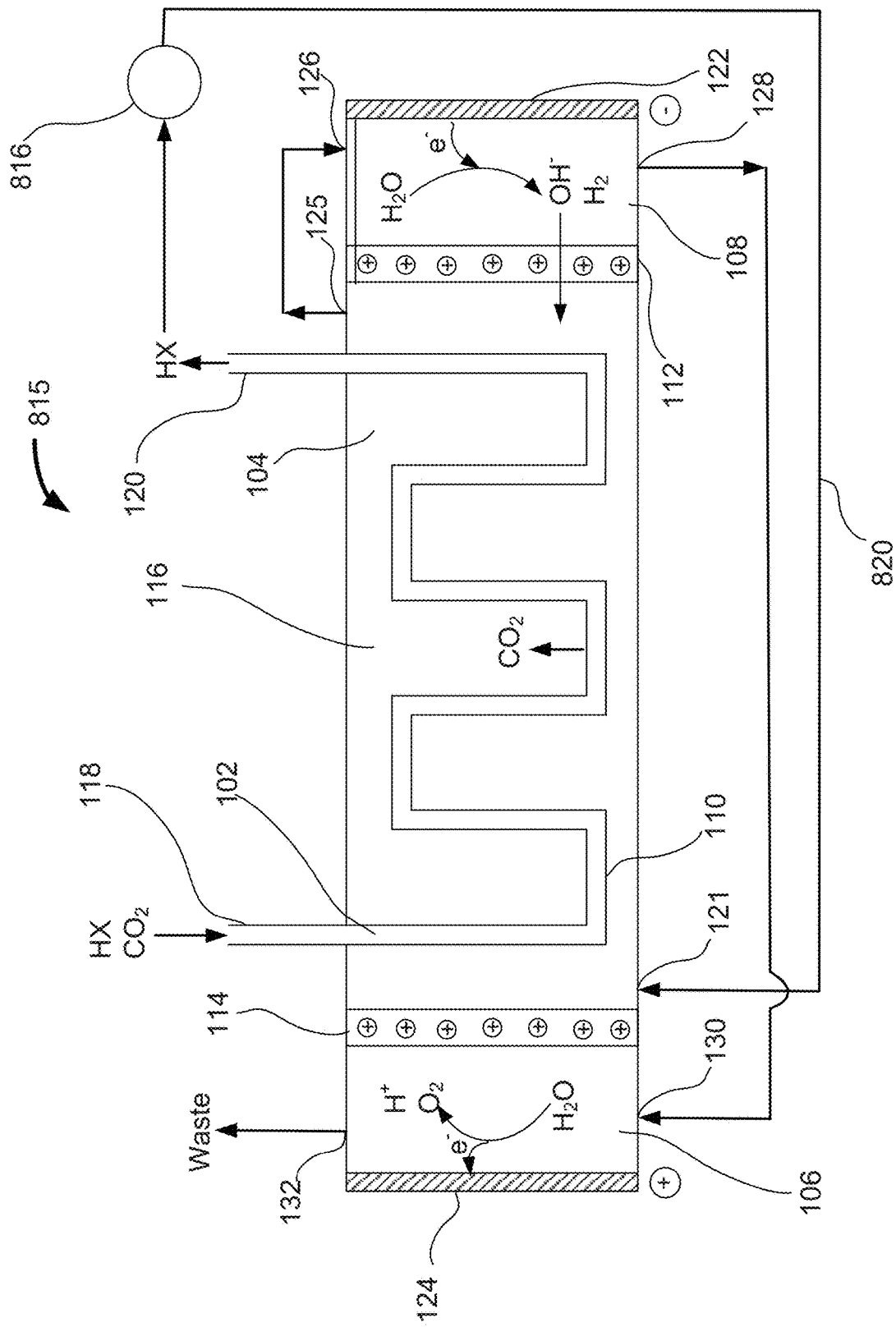
FIG. 1 illustrates a schematic embodiment of a volatile component removal device for chromatography.

Now that a general chromatography system has been described that includes a volatile component removal device, the following will describe the volatile component removal devices in more detail. FIG. 1 illustrates a schematic embodiment of a volatile component removal device 815 for chromatography. Volatile component removal device 815 may include a first chamber 102, a second chamber 104, an anode chamber 106, a cathode chamber 108, a first ion exchange barrier 110, a second ion exchange barrier 112, a third ion exchange barrier 114, and an ion exchange packing 116. It should be noted that a chamber that includes an inlet and an outlet may also be referred to as a channel.

Referring to FIG. 1, first chamber 102 includes an inlet 118 configured to receive the liquid solution that includes the volatile component, and an outlet 120 configured to output the liquid solution with a substantial portion of the volatile component removed. The liquid solution entering inlet 118 may be an output of a suppressor, an injection valve, or an eluent generator. The volatile component may be a chemical dissolved in the liquid solution and/or a gas associated with the liquid solution such as for example, carbon dioxide, carbonic acid, and ammonia. The substantial portion of the volatile component removed may be greater than about 50%, preferably greater than about 75%, more preferably greater than about 90%, and yet more preferably greater than about 95%.

Referring back to FIG. 1, second chamber 104 includes an ion exchange packing 116. Ion exchange packing 116 may in the form of a resin, a screen, a monolith, or a combination thereof. Second chamber 104 is in electrical communication with a cathode 122 and an anode 124. Electrical communication includes a flow of electrons and/or ions between cathode 122 to anode 124 via second chamber 104. Cathode 122 is configured to electrolytically generate hydroxide. Anode 124 is configured to electrolytically generate a hydronium. Note that the terms hydronium ($H_3O^+$) and hydrogen ion ($H^+$) are used interchangeably. Cathode 122 electrolytically splits water into hydroxide and hydrogen gas during an electrochemical reduction. Anode 124 electrolytically splits water into hydronium and oxygen gas during an electrochemical oxidation. As illustrated in FIG. 1, for anion analysis the hydroxide generation is proximate to outlet 125 of second chamber 104. This configuration ensures that the outlet portion of the anion exchange packing 116 in chamber 104 is fully regenerated and is not exposed to any residual carbonate. Also this configuration ensures that any carbonic acid generated at the anode is not exposed to the aqueous stream flowing out of the volatile component removal device. Referring to FIG. 1, cathode 122 is denoted as the negatively charged electrode and anode 124 is denoted as the positively charged electrode. A constant current or voltage source can be used to drive the electrolytic reactions at cathode 122 and anode 124.

In an alternative embodiment, the voltage or current polarity may be reversed where the location of the cathode and anode, as illustrated in FIG. 1, is switched on the volatile component removal device 815. In this configuration there is potential for transport of the removed volatile component back into the aqueous stream as discussed above and therefore is not the preferred configuration.

First ion exchange barrier 110 is at least partially disposed between the first chamber 102 and the second chamber 104. As illustrated in FIG. 1, an inlet portion and an outlet portion of first ion exchange barrier 110 is outside of second chamber 104 and a middle portion of first ion exchange barrier 110 is inside of second chamber 104 and in physical contact with ion exchange packing 116. Where first ion exchange barrier 110 is a cation exchange membrane, it may be of a material such as sulfonated tetrafluoroethylene (e.g. Nafion) or other fluoropolymer-copolymer. First ion exchange barrier 110 may be in the form of an ion exchange capillary tube. An inner portion of the ion exchange capillary tube can form first chamber 102. In an embodiment, the ion exchange capillary tube can be in a coiled arrangement so that it can be sufficiently long and fitted within second housing. The ion exchange capillary tube may have an inner diameter (id.) ranging from about 0.001 inches to 0.1 inches and an outer diameter (od.) ranging from 0.005 inches to 0.2 inches. The diameter is chosen in proportion to the chromatographic format of operation. For example for the capillary format of operation the membrane dimensions were 0.004 inches id. and 0.01 inches od. The membrane dimensions are chosen to ensure good volatile component removal and acceptable band dispersion particularly when the volatile component removal device is installed between the suppressor and the detector cell. For sample pretreatment applications band dispersion may not be a consideration therefore the dimensions are chosen purely from a volatile component removal perspective. Alternatively, first ion exchange barrier may include a substantially flat sheet.

First ion exchange barrier 110 should have a positive or negative charge so as to reduce the likelihood of back diffusion of the volatile component back into first chamber 102. For example, in the case of removing carbon dioxide or carbonic acid, the neutral fraction would be freely transported across a cation exchange membrane which has a negative charge stemming from the stationary sulfonated functionalities. The reaction of the removed carbonic acid with the anion exchange material on the other side of the membrane results in formation of carbonate anion as a counterion to the anion exchange material. In this case the carbonate anion would be repelled by the negative charge on the cation exchange membrane thus minimizing diffusion of the removed volatile component anion back into the aqueous stream.

First ion exchange barrier 110 has a first charge and by design allows the flow of ions having a charge opposite to the first charge, and does not allow bulk flow of the liquid solution. Because the volatile components of interest are a weakly ionized species, a predominant proportion of the weakly ionized species is neutral and can be easily be transported across the first ion exchange barrier 110. A weakly ionized species refers to the situation where only a small proportion of the volatile component is ionized ($HCO_3^-$ or $CO_3^{2-}$) and the predominant proportion has a neutral charge ($H_2CO_3$). In an embodiment, a predominant proportion can refer to a situation that is 90% or greater $H_2CO_3$. Ion exchange packing 116 has a second charge that is an opposite polarity to the first charge. In an embodiment, first ion exchange barrier 110 can have a first charge that is negative and exchanges positively charged ions. Note that when the first charge is negative, then a negatively charged analyte will not traverse first ion exchange barrier 110. Neutral molecules and gaseous molecules can be transported through the first ion exchange barrier 110. For example during anion analysis the first ion exchange barrier 110 could be a cation exchange membrane that is negatively charged owing to the sulfonated charges on the membrane. A suitable membrane would be a sulfonated membrane prepared by a radiation grafting process as described in Examples 1 and 2 in U.S. Pat. No. 4,999,098 and in Example 1 in U.S. Pat. No. 6,077,434, which is hereby fully incorporated by reference herein. This membrane would allow transport of cationic moieties which are the counterions to the stationary charges on the membrane. Negatively charged moieties would be repelled by the stationary negative charges on the cation exchange membrane. Neutral molecules can be transported across the membrane. Ion exchange packing 116 is an anion exchanger with stationary positively charged substrate material. This material is capable of exchanging and retaining anions. Suitable materials include primary, secondary, tertiary, or quaternary amine functionalized inorganic or organic particles. The most preferred anion exchange packing materials includes quaternary amine functionalized inorganic or organic particles.

The substrate materials for the first ion exchange barrier can be chosen so that the device back pressure resiliency is high. For example with polyethylene, polypropylene, or polytetrafluoroethylene substrates, the device can easily operate with backpressures exceeding 200 PSI or more so long as the substrate is sufficiently thick. The polyethylene or polypropylene may be in the form of a woven monofilament. The polyethylene, polypropylene, or polytetrafluoroethylene substrates can then be derivatized with ion exchange functionality using radiation grafting. With substantially flat membranes (i.e. planar membranes), volatile component removal devices can operate reliably up to 800 PSI. This higher pressure resilience allows devices with substantially flat membranes to be used with multiple detectors. Other volatile component removal devices have used CELGARD® membranes (polyethylene and/or polypropylene) that are microporous and relatively thin. Such devices using CELGARD® membranes do not operate reliably at greater than 100 PSI.

Neutral volatile component such as carbon dioxide or carbonic acid can be transported across the cation exchange membrane where the volatile component then reacts with the hydroxide ions present on the anion exchange packing and becomes converted to carbonate or bicarbonate anion, which are retained on the anion exchanger. The electrolysis generated hydroxide ions generated at the cathode are transported across second chamber 104 to regenerate the anion exchange packing 116. The anions on anion exchange packing are driven to the anode by the applied voltage and combine with the electrolytically generated hydronium ions to form water or carbonic acid which is removed out of the device. Thus, volatile component removal is feasible in the present device. Since the anion exchange packing is continuously regenerated there is no need for additional reagents or additional external pumps. The water required for the electrolysis can be derived by recycling the aqueous stream from the detector, and thus, the device can operate without any added regenerative reagents. It should be noted that, for anion analysis, the membrane has to have an anionic stationary charge with exchangeable cations. The device will not operate properly for anion analysis where the first ion exchange barrier has a charge opposite the anion analyte. For example, a first ion exchange barrier having a cationic stationary charge with exchangeable anions will retain the anion analytes of interest.

For cation analysis, the opposite configuration would work well for cation analysis where the first ion exchange barrier has a cationic stationary charge with exchangeable anions. In this case, the volatile component can be ammonia in equilibrium with ammonium ion ($NH_4^+$) where the ammonium ion will be retained by an ion exchange packing that is a cation exchanger. Regeneration of the cation exchange packing ensures that the device would operate continuously. Thus, the devices described herein can provide a) a removal of the volatile component from a liquid stream, b) a retention of the removed volatile component on an oppositely charged ion exchange packing, c) a continuous operation to regenerate the oppositely charged ion exchange packing, and d) a recycle mode with electrolytic generation of hydroxide and hydronium negating the need for added regenerative reagents.

Ion exchange packing 116 is configured to react with the volatile component to create a charged component having a same polarity as the first charge of the first ion exchange barrier 110. This configuration ensures that the removed species in the ionic form is repelled from the ion exchange barrier 110 and therefore removed permanently. The ion exchange packing 116 is also configured to bind the charged component. In an embodiment, the ion exchange packing 116 includes an ion exchange resin and is in physical contact with the first ion exchange barrier 110.

Figure 2:
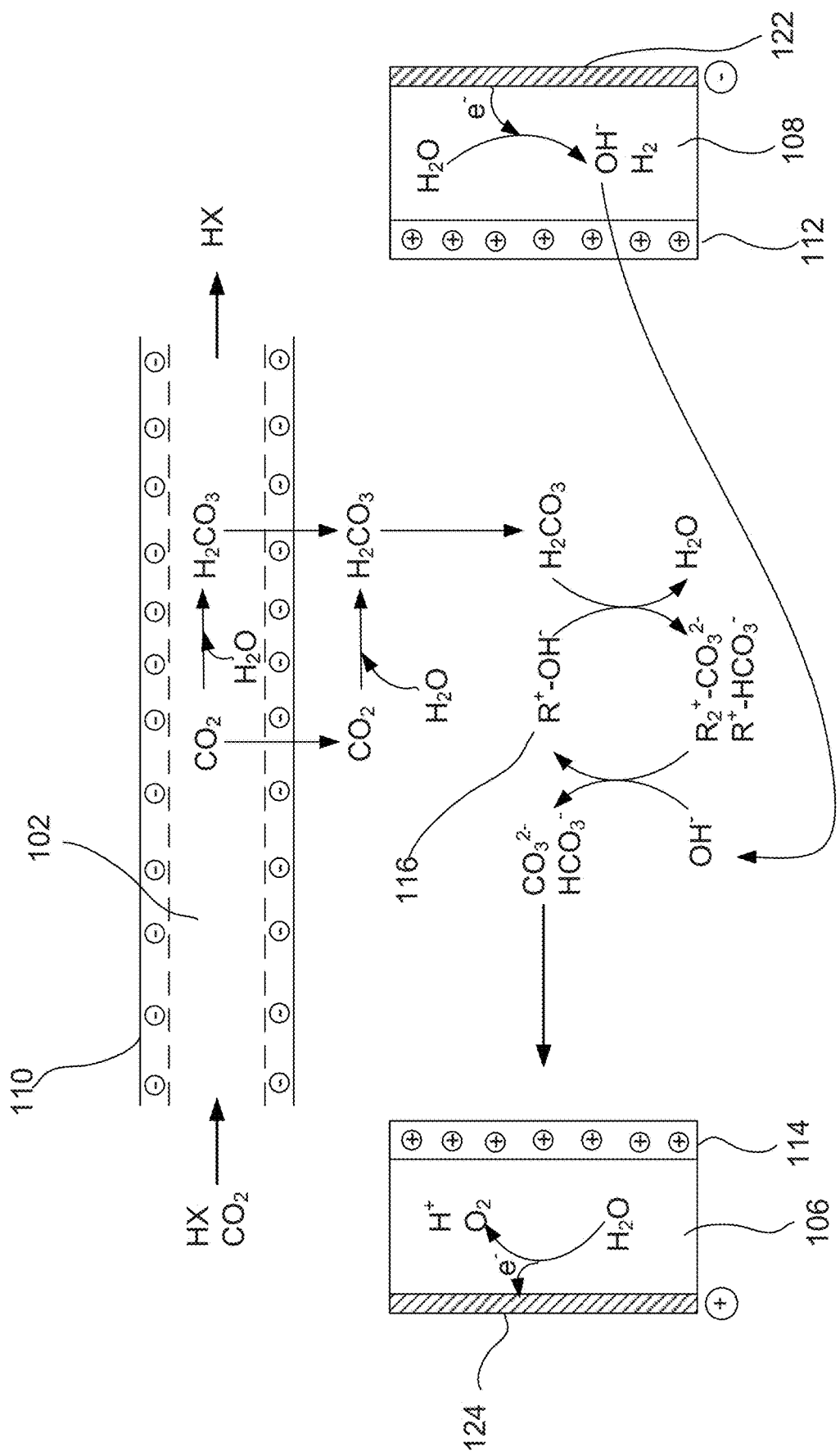
FIG. 2 is a simplified schematic embodiment of the volatile component removal device in accordance with FIG. 1, which schematically illustrates the gas and ion flows.

For example, as illustrated in FIG. 2, either carbon dioxide or carbonic acid can diffuse through first ion exchange barrier 110. Note that carbon dioxide can be hydrated with water to form carbonic acid within either first chamber 102 or second chamber 104. Where the ion exchange packing 116 is an anion exchange packing in a hydroxide form, carbonic acid can react with the hydroxide ion on the anion exchange packing to form charged components such as carbonate or bicarbonate. The resulting carbonate or bicarbonate can then be bound by ion exchange packing 116. Note that the charged components carbonate and bicarbonate have a negative charge which is the same polarity as first ion exchange barrier 110. Thus, the conversion of the volatile component to the charged form and binding of the negatively charged components to ion exchange packing 116 and the repulsive Donnan forces of the first ion exchange barrier 110 reduces the likelihood of the volatile component diffusing back into the first chamber 102. Applicant believes that the added Donnan forces combined with an intimate interaction between the ion exchange packing and the first ion exchange barrier provided the surprising result of an increased efficiency in removing volatile component removal when compared to degas assemblies using neutral membranes such as silicone. An example of a silicone based carbon dioxide removal device is described in U.S. Pat. No. 7,306,720, which is hereby fully incorporated by reference herein. Applicant also believes that the hydroxide form of ion exchange packing 116 traps carbonate and bicarbonate more efficiently than hydroxide in solution. Further the facile electrolytic regeneration of the ion exchange packing 116 also allows for continuous operation without disturbing the removal function.

In one embodiment, the volatile component includes carbon dioxide, carbonic acid, or a combination thereof, the liquid solution includes an anion as the analyte, and the first charge of the first ion exchange barrier 110 is negative. In this embodiment, the anion analyte does not bind to the negatively charged first ion exchange barrier 110.

In another embodiment, the volatile component includes ammonia, the liquid solution includes a cation as the analyte, and the first charge of the first ion exchange barrier is positive. In this embodiment, the cation analyte does not bind to the positively charged first ion exchange barrier.

Referring back to FIG. 1, cathode chamber 108 includes cathode 122, and anode chamber 106 includes an anode 124. In an embodiment, cathode chamber 108 and anode chamber 106 are disposed on opposing ends of second chamber 104. A second ion exchange barrier 112 is at least partially disposed between the cathode chamber 108 and the second chamber 104. Second ion exchange barrier 112 has a third charge that is an opposite polarity to the first charge. Second ion exchange barrier 112 is configured to not allow bulk flow of the liquid solution, and to allow the flow of ions having a charge opposite to the third charge, from the cathode chamber 108 to the second chamber 104. For example, the third charge can be positive that corresponds to an anion exchange barrier (e.g., second ion exchange barrier 112) where the first charge is negative that corresponds to a cation exchange barrier (e.g., first ion exchange barrier 110).

A third ion exchange barrier 114 is at least partially disposed between anode chamber 106 and second chamber 104. Third ion exchange barrier 114 has a fourth charge that is an opposite polarity to the first charge. Third ion exchange barrier 114 is configured to not allow bulk flow of the liquid solution, and to allow the flow of ions having a charge opposite to the fourth charge, from the second chamber 104 to the anode chamber 106. For example, the fourth charge can be positive that corresponds to an anion exchange barrier (e.g., third ion exchange barrier 114) where the first charge is negative that corresponds to a cation exchange barrier (e.g., first ion exchange barrier 110). Materials suitable to use for second ion exchange barrier 112 and third ion exchange barrier 114 can be found in U.S. Pat. Nos. 4,999,098 and 6,077,434, which are hereby fully incorporated by reference herein.

The following will describe the fluidic connections of volatile component removal device 815. Referring back to FIG. 1, outlet 120 of first chamber 102 is fluidically connected to an inlet of detector 816. An outlet of detector 816 is fluidically connected via a recycle line 820 to an inlet 121 of second chamber 104. An outlet 125 of second chamber 104 is fluidically connected to an inlet 126 of cathode chamber 108. An outlet 128 of cathode chamber 108 is fluidically connected to an inlet 130 of anode chamber 106. An outlet 132 of the anode chamber 106 is fluidically connected to a waste chamber or optionally routed as a regenerant liquid to other electrolytic devices as needed. It should be noted that inlet 121 and outlet 125 of second chamber 104 can be configured so that liquid flows concurrently or countercurrently with respect to the liquid flow in first chamber 102. Counter current flow has the advantage that the outlet of the device in the proximity of 120 has a substantially reduced amount of the volatile component.

Figure 3:
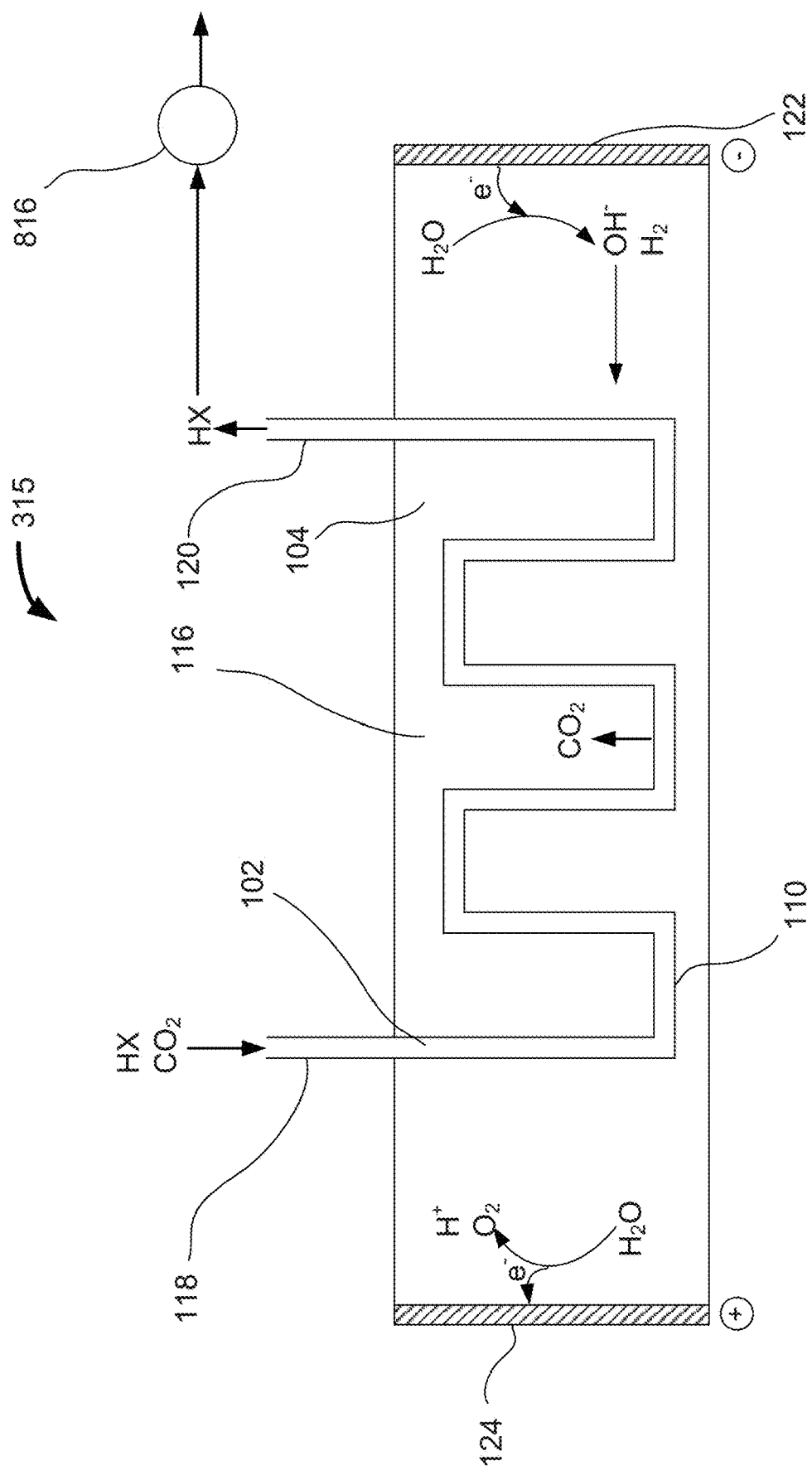
FIG. 3 illustrates another schematic embodiment of a volatile component removal device that does not have a separate anode chamber and a cathode chamber.

In an alternative embodiment, FIG. 3 illustrates a schematic embodiment of a volatile component removal device 315 that is similar to device 815 in FIG. 1. Volatile component removal device 315 is simpler in that it does not have an anode chamber and a cathode chamber, and the associated second and third ion exchange barrier, respectively (112 and 114). As a result, electrodes 122 and 124 are in direct contact with second chamber 104 allowing the electrolytically generated hydroxide and hydronium ions to flow through second chamber 104. Unlike the volatile component removal device 815 of FIG. 1, there is no third ion exchange barrier to prevent the flow of hydronium ions generated at the anode within the second chamber 104, where the third ion exchange barrier is an anion exchange membrane. Thus, hydronium ions can charge an area proximate to an inlet portion 118 of the first ion exchange barrier 110. There is also no second ion exchange barrier to prevent the flow of hydroxide ions generated at the cathode within the second chamber 104, where the second ion exchange barrier is an anion exchange membrane. Thus, hydroxide ions can charge an area proximate to an outlet portion 120 of the first ion exchange barrier 110. Optionally, second chamber 104 can have an inlet 121 and outlet 125 similar to volatile component removal device 815 where the inlet is proximate to anode 124 and the outlet is proximate to cathode 122. This device 315 is also capable of removing the volatile component and regenerating the ion exchange packing 116 in chamber 104. As described above, it is feasible to have a volatile component removal device with only one chamber for both electrodes such as, for example, device 315.

Now that the volatile component removal device has been described, the following will describe the method of using such a device. A method of removing a volatile component from a liquid solution for a chromatographic separation includes flowing the liquid solution, that includes the volatile component, through a first chamber. The liquid solution may come from a liquid source before a pump, after a pump, after an eluent generator, after a catalytic gas elimination device, after an injection valve, or after a suppressor. For an embodiment where the suppressor is upstream of the volatile component removal device and the analyte is an anion, the liquid solution is suppressed with a suppressor that removes positively charged ions and acidifies the liquid solution before the flowing of the liquid solution through the first chamber.

The volatile component is transferred across first ion exchange barrier 110 from first chamber 102 to second chamber 104. The volatile component can react with the ion exchange packing 116 to create a charged component in the second chamber 104. The charged component has a third charge that is a same polarity to the first charge, which causes the charged component to not flow across the first ion exchange barrier 110. The ion exchange packing 116 can be regenerated by electrolytically generating hydronium or hydroxide, in which the hydronium or the hydroxide is in electrical communication with the ion exchange packing 116. The hydronium or hydroxide can flow across first ion exchange barrier 110 from cathode chamber 108 to second chamber 104.

For the embodiment in which the ion exchange packing 116 is an anion exchange packing, the electrolytically generated hydroxide flows through the second chamber to regenerate the hydroxide form of the ion exchange packing 116 and to remove the negatively charged ion out of the second chamber. The electrolytically generating hydronium or hydroxide provides a product feature in which additional chemical reagents do not need to be added to the volatile component removal device making the system easier to use and maintain, especially during extended times needed for analysis. The water required for the electrolysis is derived from the detector 816 waste in the above setup and allows for facile continuous operation.

After flowing the liquid solution from first chamber 102 to detector 816, a signal can be measured that is proportional to an analyte concentration. From detector 816, the liquid solution is flowed to second chamber 104. In second chamber 104, the liquid solution flows through ion exchange packing 116 and out of second chamber 104 to cathode chamber 108, and then to anode chamber 106. In an embodiment where the second ion exchange barrier 112 is an anion exchange barrier, hydroxide generated in cathode chamber 108 is transported through second ion exchange barrier 112 to second chamber 104. The negatively charged hydroxide can migrate towards the positively charged anode 124 and in the process regenerate ion exchange packing 116 throughout second chamber 104. In the regeneration process, carbonate and bicarbonate are removed from the ion exchange packing 116 and migrated towards the positively charged anode 124. The negatively charged hydroxide, carbonate, and bicarbonate can be transported through third ion exchange barrier 114 from second chamber 104 to anode chamber 106, and then to waste.

In another embodiment, the method further includes converting an analyte to a salt form in the first chamber. Thus, not only does volatile component removal device remove volatile components, but it also can function as a salt converter. In this embodiment, first ion exchange barrier 110 may be in a sodium form by supplying sodium hydroxide base to the second chamber 104. The first ion exchange barrier 110 in sodium form converts the hydrochloric acid to sodium chloride. Detecting ions in a salt form can provide a linear response using a conductivity detector as a function of concentration curve where the analyte is a weakly dissociated species.

Figure 9:
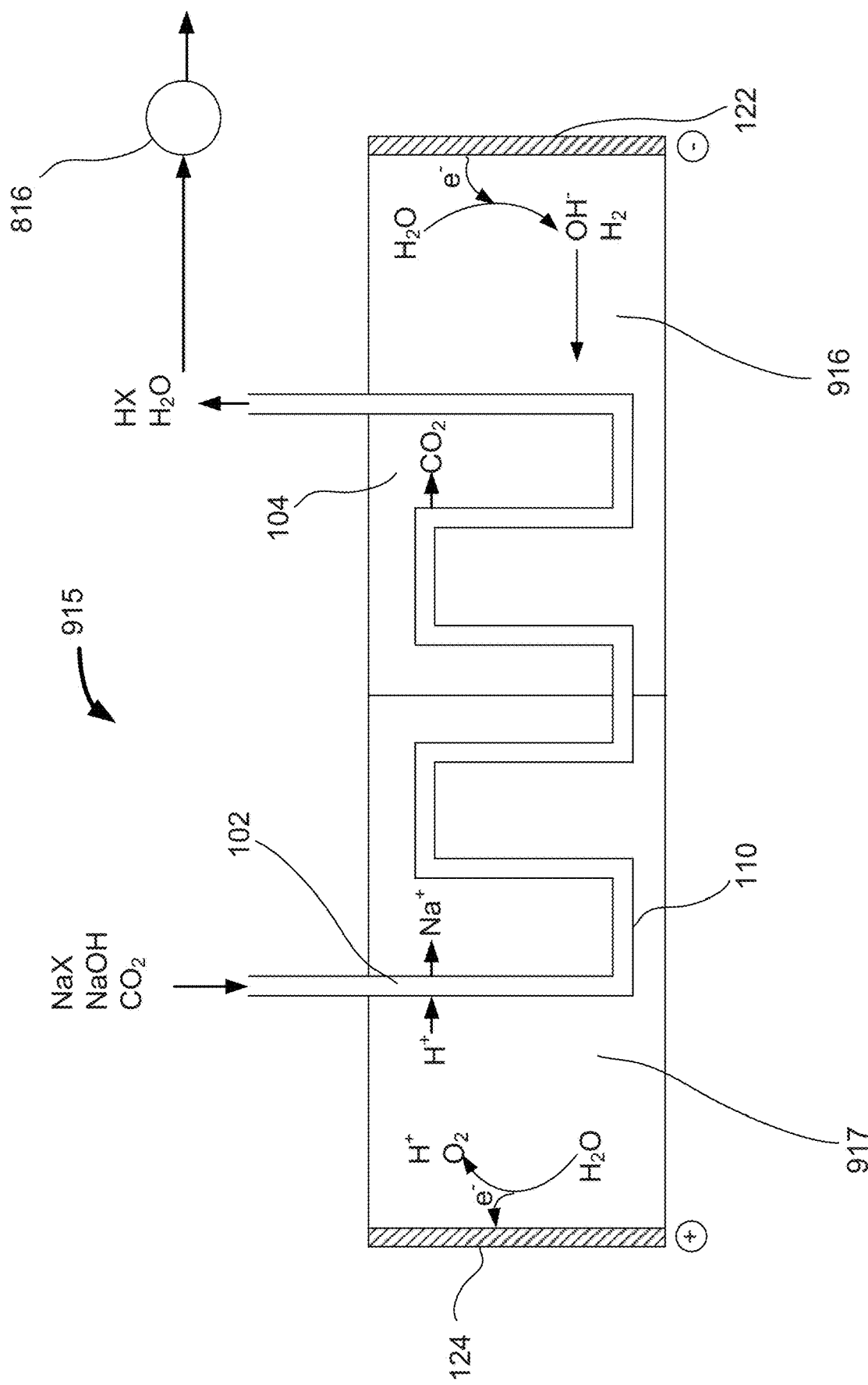
FIG. 9 illustrates a schematic embodiment of a combination device configured to suppress an eluent stream and remove volatile components for chromatographic analysis.

In another embodiment, a component removal device can be configured to remove volatile species such as carbonic acid from the sample stream and also suppress the eluent and the sample. In this case, suppression of the eluent refers to removing $Na^+$ ions and neutralizing the $OH^-$ ions into water. Suppression of the sample refers to converting the analyte anion to the acid form. FIG. 9 illustrates a combination device 915 to suppress an eluent stream and remove volatile components where a second chamber 104 has two types of ion exchange packing. A first zone of second chamber 104 includes a cation exchange packing 917 and a second zone of second chamber 104 includes an anion exchange packing 916. The first zone is proximate to anode 124 and the second zone is proximate to cathode 122. Combination device 915 provides an advantage in that a separate suppressor is not needed. In this embodiment, first ion exchange barrier 110 can be a cation exchange membrane, where a portion of the cation exchange membrane in the first zone, has exchangeable hydronium ions, which can suppress the eluent and sample stream. The cations are transferred from first chamber 102 to the first zone of second chamber 104 by combining with a cation exchange packing 917. The hydronium ions generated at anode 124 can regenerate cation exchange packing 917. The volatile component is transferred from first chamber 102 to the second zone of second chamber 104 by combining with an anion exchange packing 916. The hydroxide ions generated at cathode 122 can regenerate anion exchange packing 916. A multi-function device that performs both suppression and volatile component removal reduces the number of plumbing connections along with associated band dispersion of the measured analyte peaks from connections and lines.

Figure 10:
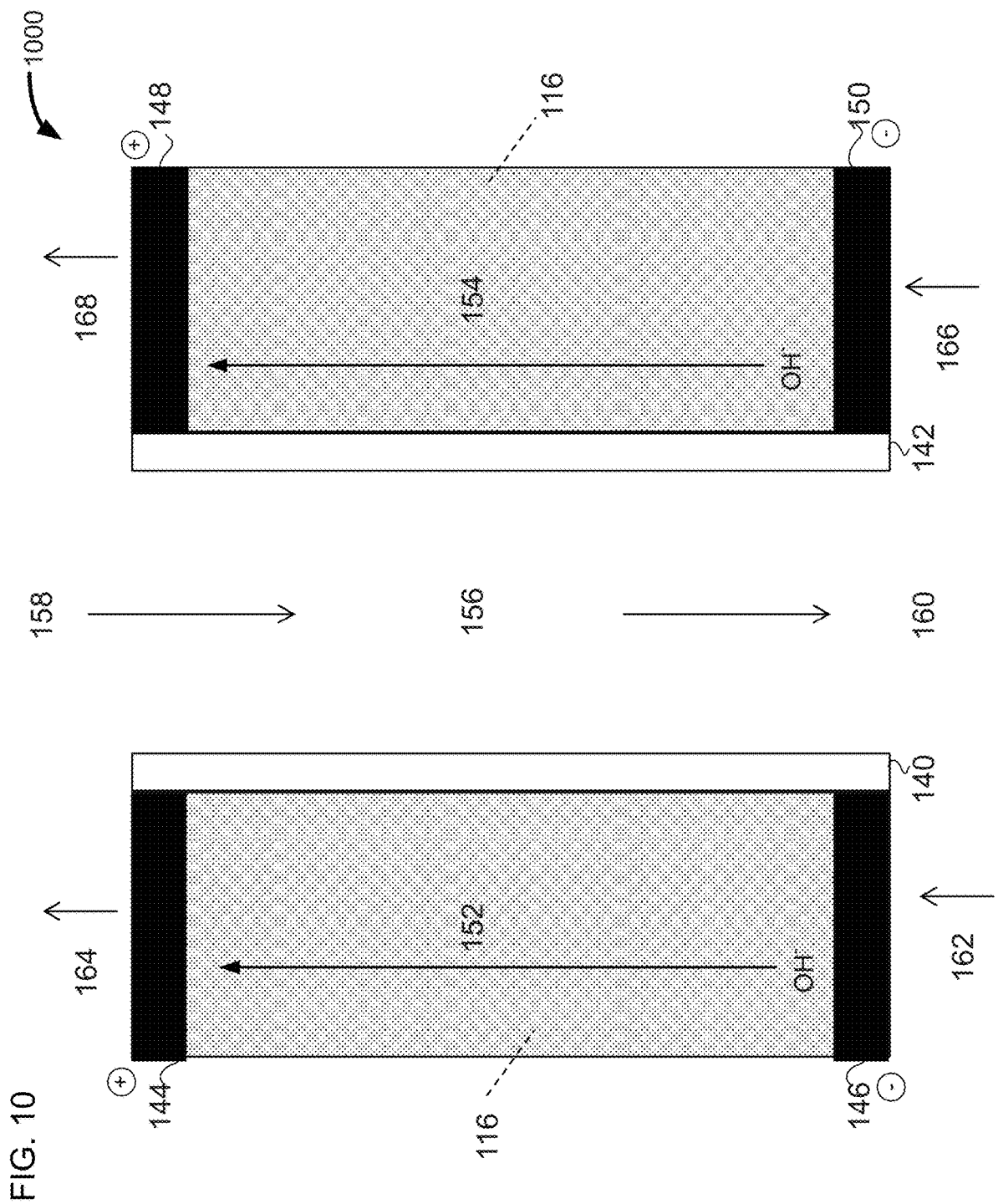
FIG. 10 illustrates another schematic embodiment of a volatile component removal device which is based on a flat membrane configuration where electrolytically generated hydroxides flow in a direction influenced by an electric field parallel to the liquid stream containing the volatile component.

FIG. 10 shows another embodiment of a volatile component removal device 1000. In this embodiment, a first ion exchange barrier is in the form of two approximately planar membranes 140 and 142 and are used for the volatile component removal function. The two approximately planar membranes 140 and 142 form at least a part of a first chamber, which is in the form of a central channel 156. A planar membrane is a membrane that lies in a plane and is approximately flat. Referring to FIG. 10, the two approximately planar membranes 140 and 142 define a three chamber device. The central channel 156 is an eluent channel and is similar to first chamber 102 of FIG. 1. Volatile component removal device 1000 includes a second chamber and a third chamber, which correspond to side channels 152 and 154, respectively. The side channels 152 and 154 contain the ion exchange packing material 116. Each of the side channels 152 and 154 are similar to second chamber 104 of FIG. 1 in that each side channel includes ion exchange packing.

As illustrated in FIG. 10, the two side channels 152 and 154 are each in electrical communication with two electrodes. Electrodes 144 and 146 are arranged to ensure the regeneration of the ion exchange packing material in side channel 152. Similarly, electrodes 148 and 150 are arranged to ensure the regeneration of the ion exchange packing material in side channel 154. Electrodes 144, 146, 148, and 150 may be in a porous or a mesh format. In a preferred embodiment as shown in FIG. 10, the liquid flow in the central channel with respect to both of the side channels is counter current. This directionality aids in a substantial removal of the volatile component.

In operation, when pursuing anion analysis, the outlet of the suppressor is fluidically connected to an inlet port 158 of central channel 156. The outlet port 160 of central channel 156 is connected to the inlet of a detector (not shown). The outlet from the detector is split to form two streams providing water for the electrolysis reactions via ports 162 and 166 of side channels 152 and 154, respectively. The outlet from 164 and 168 of side channels 152 and 154, respectively, are routed to waste or alternatively to other electrolysis devices as a regenerant stream. The carbon dioxide and/or carbonic acid from the suppressed eluent stream in central channel 156 are transported through ion exchange barriers 140 and 142 to channels 152 and 154, respectively. The transported carbonic acid can then react with the anion exchange packing material 116 and become converted to bicarbonate and/or carbonate anion, which is then retained by the anion exchange packing material. Hydroxide generated by electrolysis at electrodes 146 and 150, which are configured as cathodes, is driven by an applied electrical field strength towards the anodes 144 and 148, respectively. This transport of hydroxide regenerates the anion exchange packing 116 in side channels 152 and 154 and forms water or carbonic acid at the electrodes 144 and 148, respectively. It should be noted that the electrode orientation in FIG. 10 allows the regenerative hydroxide flow to occur in side channels 152 and 154 in a direction parallel to the counter current eluent flow in central channel 156. Anodes 144 and 148 are configured to generate hydronium, which combines with the carbonate and/or bicarbonate anion that is transported from the resin to the anode and is swept out of the side channels 152 and 154 as carbonic acid, when the volatile removal device 1000 has counter current eluent flow. Anode 144 and cathode 146 can each have an approximately planar surface. A plane of planar membrane 140 is approximately perpendicular to the planar surfaces of the cathode 146 and anode 144. In an embodiment, approximately perpendicular may be an angle of about 80 degrees to about 100 degrees. When the packing material in the side channels 152 and 154 are packed with ion exchange screen based packing material then the electrodes 144 and 146 can be parallel to the screen orientation. Applicant found that volatile removal device 1000 could operate at relatively higher pressures of about up to 800 PSI due to the relatively high resiliency of the substantially flat membranes.

Referring back to FIG. 10, side channel 154 (i.e. third chamber) includes ion exchange packing 116. Cathode 150 and anode 148 are at least partially disposed in side channel 154. Planar membrane 142 (i.e., fourth ion exchange barrier) is at least partially disposed between central channel 156 and side channel 154. Planar membrane 142 has the same charge as planar membrane 140. Cathode 150 and anode 148 can each have an approximately planar surface. In one preferred embodiment, the plane of the approximately planar membrane 142 is approximately perpendicular to planar surfaces of cathode 150 and anode 148.

Figure 11:
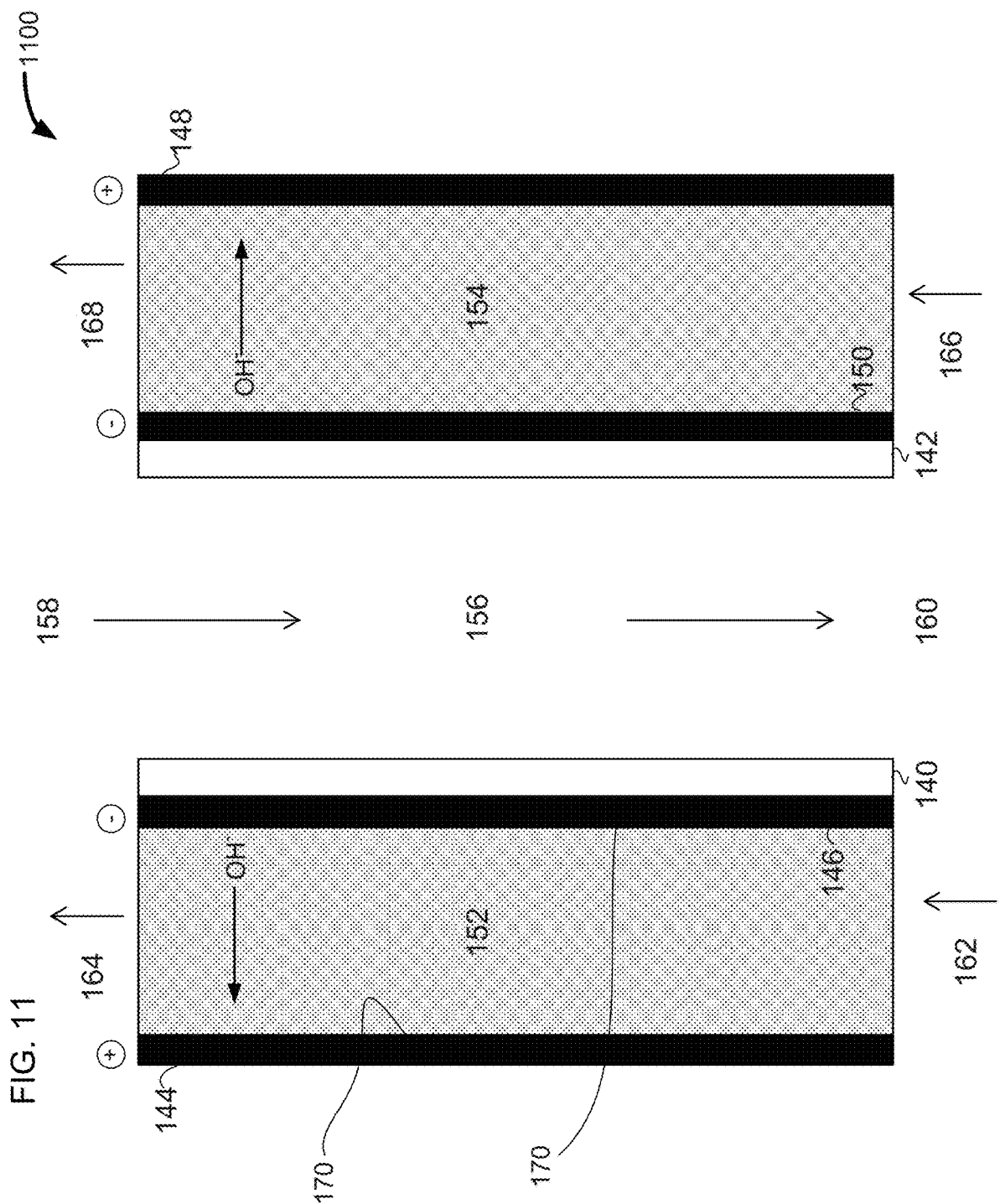
FIG. 11 illustrates another schematic embodiment of a volatile component removal device which is based on a flat membrane configuration where electrolytically generated hydroxides flow in a direction influenced by an electric field perpendicular to the liquid stream containing the volatile component.

FIG. 11 shows another embodiment of a volatile component removal device 1100. All elements are similar to volatile component removal device 1000 of FIG. 10 except the orientation of the electrodes. The electrodes 144 and 146 are oriented so that the liquid flow in side channels 152 and 154 are substantially parallel to a planar portion 170 for each of electrodes 144 and 146. Cathodes 146 and 150, and anodes 144 and 148 each have a planar surface. The plane of the approximately planar membranes 140 is approximately parallel to the planar surfaces of cathode 146 and anode 144. Similarly, the plane of the approximately planar membranes 142 is approximately parallel to the planar surfaces of cathode 150 and anode 148. In one preferred embodiment of removing carbon dioxide, the parallel format of the planar membranes and the cathodes are configured so that the electrolytically generated hydroxide is proximate to the surface of the planar membranes. This helps to ensure that the anion exchange packing proximate to the planar membranes is regenerated with hydroxide.

For anion analysis, the electrodes 146 and 150 are cathodes while electrodes 144 and 148 are anodes as illustrated in FIG. 11. Electrodes 144, 146, 148, and 150 may be in a porous or a mesh format. The flow direction in side channels 152 and 154 are countercurrent to the suppressed eluent flow in central channel 156 similar to what is shown in FIG. 10. Not only did Applicant find that volatile removal device 1100 could operate at relatively higher pressures like volatile removal device 1000, but Applicant also found that the overall resistance between two electrodes in a pair (144-146, and 148-150) was decreased, which provided improved electrolytic efficiency compared to device 1000. The reduced resistance is ascribed to a smaller pathway in between the electrodes. The distance between the electrodes 144 and 146, and between electrodes 148 and 150 shown in FIG. 10 is preferably less than about 7 inches, and more preferably the distance is less than about 4 inches. The distance between the electrodes shown in FIG. 11 when implemented with a packing material, that includes a screen, is defined by the thickness of the screen. In the embodiment of FIG. 11, the preferred distance between the electrodes 144 and 146, and between electrodes 148 and 150 is less than about 0.1 inches, and more preferably is less than about 0.05 inches, and yet more preferably is less than about 0.03 inches.

Figure 12:
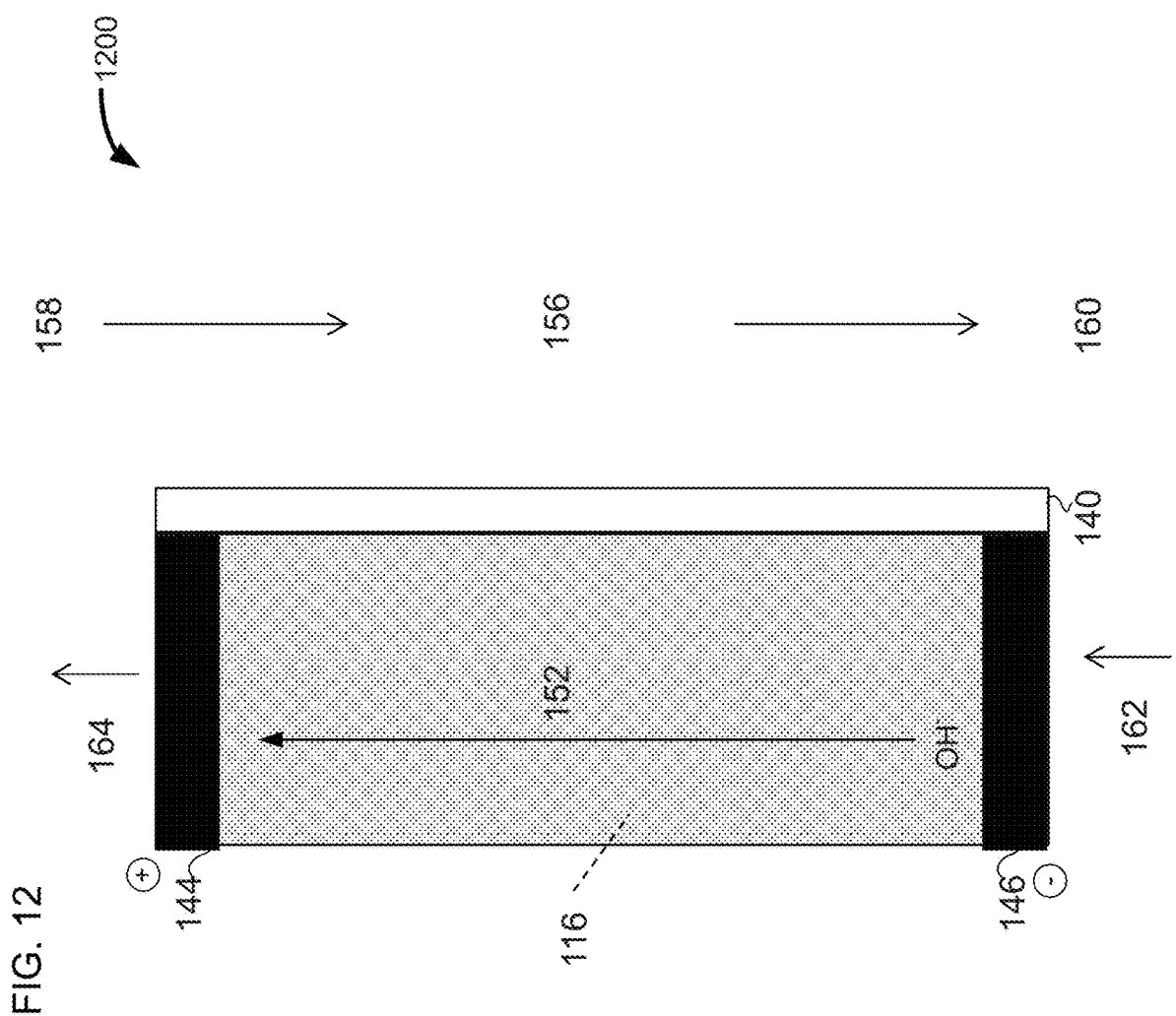
FIG. 12 illustrates another schematic embodiment of a volatile component removal device which is similar to the device of FIG. 10 except that it has only one side channel.

It should be noted that while the volatile component removal devices 1000 and 1100 above are illustrated with a three channel design, they can be implemented with only one side channel and not two side channels. Also, volatile component removal devices can be incorporated in designs that use multiple channels. FIG. 12 illustrates a volatile component removal device 1200 which is similar to device 1000 except that device 1200 has only one side channel. Instead of including a side channel 154, device 1200 can include a block (not shown) to form a wall portion of the central channel 156. Approximately planar membrane 140 defines a boundary portion for side channel 152 and central channel 156.

FIG. 13 illustrates a volatile component removal device 1300 which is similar to device 1100 except that device 1300 has only one side channel. Instead of including a side channel 154, device 1300 includes a block (not shown) to form a wall portion of the central channel 156. In general, single side channel devices have lower capacity for removing volatile components, but may be sufficient under certain circumstances and are simpler to construct.

EXAMPLE 1

A volatile component removal device 815 was constructed in accordance with FIG. 1 where first ion exchange barrier 110 was in the form of a cation exchange capillary tubing. The cation exchange tubing was prepared from a radiation grafting process and had the dimensions of 0.004 inches internal diameter and 0.010 inches outer diameter. The length of the tubing was 10.62 inches. Volatile component removal device 815 was plumbed into an ion chromatography system such that the output of a suppressor was attached to an input of the cation exchange capillary tubing in a manner consistent with the chromatography system of FIG. 8.

EXAMPLE 2

Figure 4:
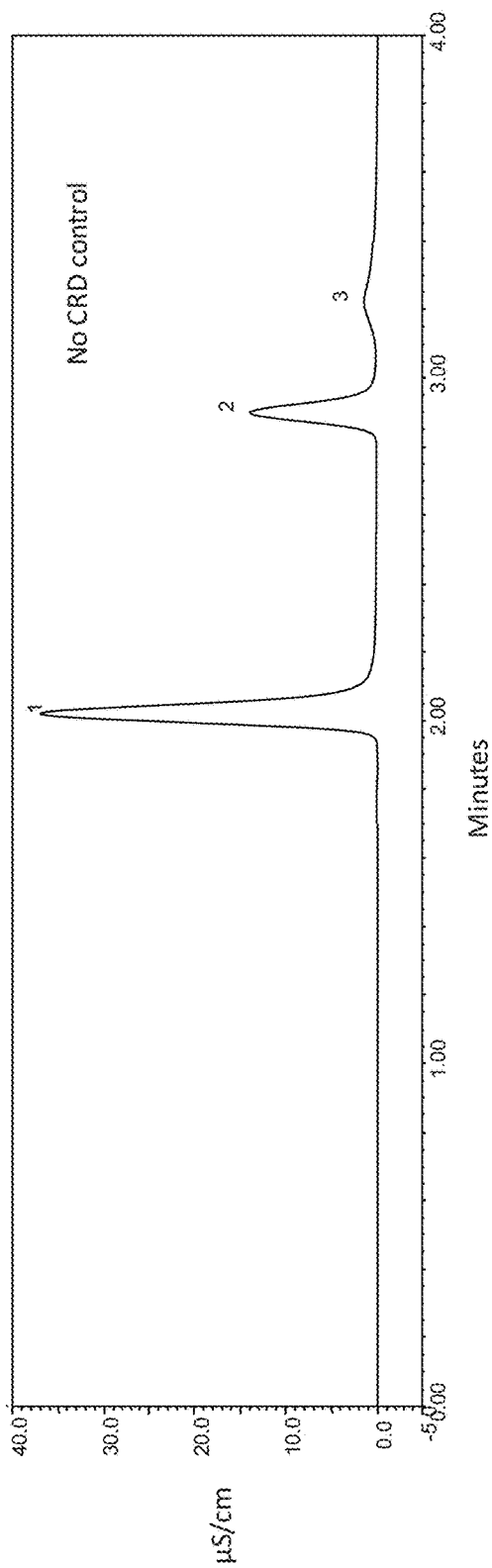
FIG. 4 is a chromatogram of a sample containing fluoride (1), chloride (2), and carbonate (3) and did not use a volatile component removal device.
Figure 5:
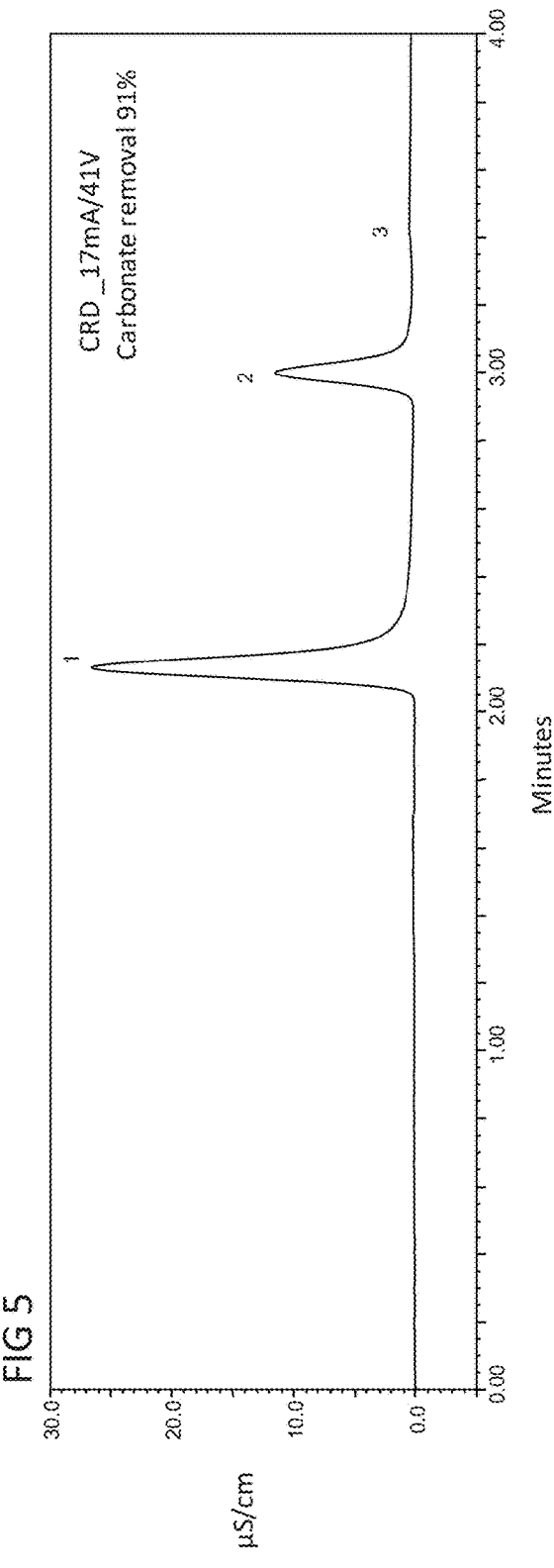
FIG. 5 is a chromatogram of a sample containing fluoride (1), chloride (2), and carbonate (3) where a volatile component removal device was used in accordance with FIG. 1.

The device of Example 1 was tested for carbonate peak removal by injecting a sample comprising of 30 mg/L of carbonate, 5 ppm fluoride and 3 ppm chloride. An anion exchange chromatography column was used, which in this case was the commercially available column IonPac AS11-HC (Thermo Scientific Dionex, Sunnyvale, Calif., USA) packed with 9 micron particles. The eluent concentration was 30 mM KOH at a flow rate of 15 µL/min. The column temperature was set to 30° C. and the compartment temperature where the injection valve, suppressor and the volatile component removal were placed was set to 15° C. The injection volume was 0.4 µL. A control run was first run without volatile component removal device 815 installed to gauge the peak response for the carbonate peak, as was illustrated by the chromatogram of FIG. 4, which shows three sequential chromatographic peaks (peak 1—fluoride, peak 2—chloride, and peak 3—carbonate). Next, the volatile component removal device 815 from Example 1 was installed and a chromatogram was obtained with the sample, as illustrated in FIG. 5. The volatile component removal device 815 was connected to a power supply and was regenerated using a constant current setting of 17 mA and resulted in a voltage of 41 volts. A 91% reduction in the carbonate peak area (peak 3 of FIGS. 4 and 5) was observed when using volatile component removal device 815 indicating excellent carbonate removal.

EXAMPLE 3

Figure 6:
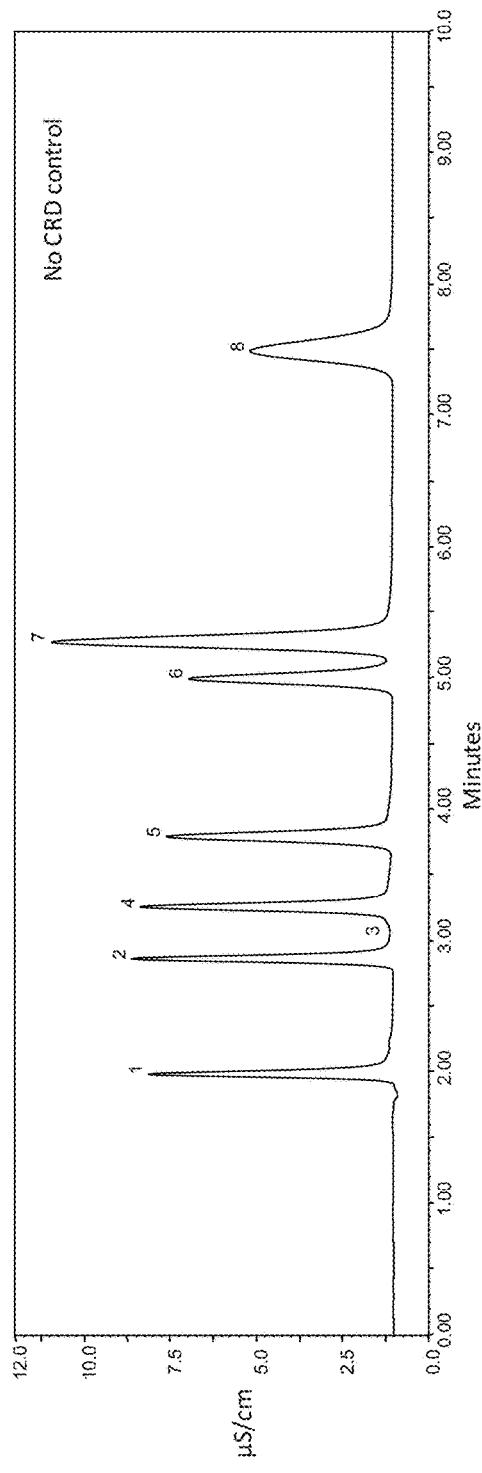
FIG. 6 is a chromatogram of a seven anion test mixture containing fluoride (1), chloride (2), carbonate (3), nitrite (4), sulfate (5), bromide (6), nitrate (7), and phosphate (8) that did not use a volatile component removal device.
Figure 7:
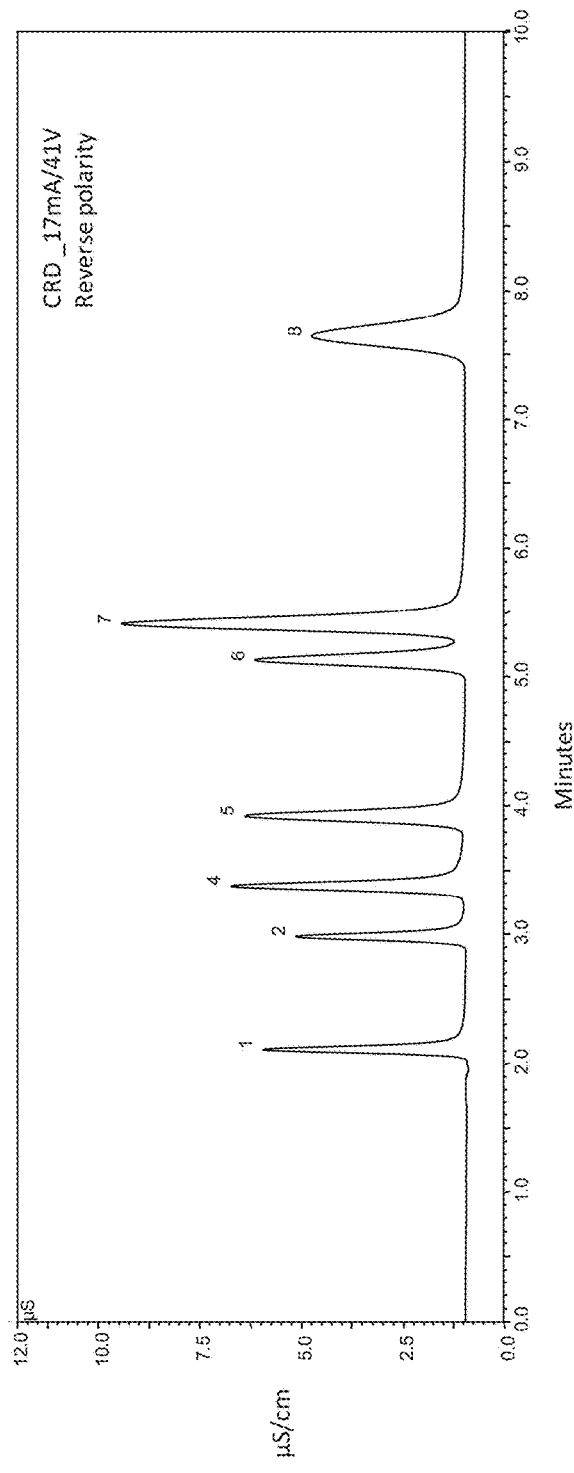
FIG. 7 is a chromatogram of the seven anion test mixture containing fluoride (1), chloride (2), nitrite (4), sulfate (5), bromide (6), nitrate (7), and phosphate (8) where a volatile component removal device was used in accordance with FIG. 1.

The device was tested with another sample type that was a 7 anion test mixture to illustrate that volatile component removal device 815 provided carbonate removal in the presence of common anions without impacting the peak shapes adversely. The chromatographic experimental conditions were similar to Examples 1 and 2. A control run was performed without volatile component removal device 815 and is illustrated by the chromatogram of FIG. 6. Peak 3 corresponds to carbonate is observed just before Nitrite (peak 4) and affected the integration of peak 4. Next, a chromatogram was performed with volatile component removal device 815 from Example 1 and is illustrated in FIG. 7. By removing the carbonate peak integration of Nitrite (peak 3) is significantly improved. Further comparison of the peak efficiencies showed minimal loss of peak efficiency with the volatile component removal device installed.

While preferred embodiments of the present invention have been shown and described herein, it will be apparent to those skilled in the art that such embodiments are provided by way of example only. Numerous variations, changes, and substitutions will now occur to those skilled in the art without departing from the invention. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. A method of removing a volatile component from a liquid solution for a chromatographic separation, the method comprising:
   flowing the liquid solution, that comprises the volatile component, through a first chamber;
   transporting the volatile component across a first ion exchange barrier from the first chamber to a second chamber, where the first ion exchange barrier is at least partially disposed between the first chamber and the second chamber, in which the first ion exchange barrier has a first charge, allows the flow of ions having a charge opposite to the first charge, and does not allow bulk flow of the liquid solution, and the second chamber including an ion exchange packing having a second charge that is an opposite polarity to the first charge;
   reacting the volatile component with the ion exchange packing to create a charged component in the second chamber, the charged component having a third charge that is a same polarity to the first charge, regenerating the ion exchange packing by electrolytically generating a hydronium or a hydroxide, in which the hydronium or the hydroxide is in electrical communication with the ion exchange packing;
   flowing the liquid solution from the first chamber to a detector;
   measuring a signal proportional to an analyte concentration;
   flowing the liquid solution from the detector to the second chamber;
   flowing the liquid solution through the ion exchange packing and out of the second chamber to a cathode chamber, and then to an anode chamber.

2. The method of claim 1, in which the ion exchange packing is in physical contact with the first ion exchange barrier.

3. The method of claim 1, in which the electrolytically generated hydronium is formed at an anode and the electrolytically generated hydroxide is formed at a cathode.

4. The method of claim 3, in which the volatile component comprises a weakly ionized species selected from the group consisting of carbon dioxide, carbonic acid, and combinations thereof, in which the liquid solution comprises an analyte, where the analyte comprises an anion and the first charge of the first ion exchange barrier is negative.

5. The method of claim 4, in which the ion exchange packing is in a hydroxide form where the carbonic acid reacts with the hydroxide form to create a negatively charged ion bound to the ion exchange packing.

6. The method of claim 5 further comprising: transporting the electrolytically generated hydroxide through the second chamber to regenerate the ion exchange packing and to remove the negatively charged ion out of the second chamber.

7. The method of claim 5, in which the negatively charged ion comprises an ionic species selected from the group consisting of carbonate, bicarbonate, and combinations thereof.

8. The method of claim 4 further comprising: before the flowing of the liquid solution through the first chamber, suppressing the liquid solution with a suppressor that exchanges positively charged ions where the liquid solution contains an analyte, the analyte having a same charge as the first ion exchange barrier.

9. The method of claim 8, in which the suppressing of the liquid solution comprises adding hydronium to the liquid solution.

10. The method of claim 1, in which the cathode chamber comprises the cathode, and a second ion exchange barrier is at least partially disposed between the cathode chamber and the second chamber, the second ion exchange barrier having a positive charge, allows the flow of negatively charged ions from the cathode chamber to the second chamber, and does not allow bulk flow of the liquid solution, the method further comprising:
transporting the hydroxide through the second ion exchange barrier to the second chamber.

11. The method of claim 10, in which the anode chamber comprises the anode, and a third ion exchange barrier is at least partially disposed between the anode chamber and the second chamber, the third ion exchange barrier having a positive charge, allows the flow of negatively charged ions from the second chamber to the anode chamber, and does not allow bulk flow of the liquid solution, the method further comprising:
transporting the hydroxide from the second chamber to the anode chamber.

12. The method of claim 1, in which the volatile component comprises ammonia where the first charge of the first ion exchange barrier is positive.

13. The method of claim 1, in which the first ion exchange barrier comprises an ion exchange capillary tube.

14. The method of claim 1, in which the first ion exchange barrier comprises an approximately planar membrane.

15. The method of claim 1, in which the liquid solution further comprises an analyte and an eluent, the method further comprising: converting the analyte to a salt form in the first chamber.

16. The method of claim 15, in which the eluent comprises a sodium hydroxide.

17. The method of claim 1, further comprising repelling the charged component from the first ion exchange barrier.

* * * * *